(12) United States Patent
Akihisa et al.

(10) Patent No.: US 7,917,279 B2
(45) Date of Patent: Mar. 29, 2011

(54) METHOD OF CONTROLLING A MECHANICAL COMPRESSION RATIO, A CLOSING TIMING OF AN INTAKE VALVE AND AIR STREAM

(75) Inventors: Daisuke Akihisa, Susono (JP); Eiichi Kamiyama, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 324 days.

(21) Appl. No.: 12/227,221

(22) PCT Filed: Apr. 26, 2007

(86) PCT No.: PCT/JP2007/059436
§ 371 (c)(1),
(2), (4) Date: Nov. 12, 2008

(87) PCT Pub. No.: WO2008/012971
PCT Pub. Date: Jan. 31, 2008

(65) Prior Publication Data
US 2009/0125211 A1    May 14, 2009

(30) Foreign Application Priority Data

Jul. 25, 2006  (JP) ................................ 2006-201963

(51) Int. Cl.
*F02B 75/04* (2006.01)
(52) U.S. Cl. .................... 701/103; 123/90.15; 123/48 C; 123/78 C
(58) Field of Classification Search .... 123/90.15–90.18, 123/48 C, 78 C; 701/103
See application file for complete search history.

(56) References Cited

U.S. PATENT DOCUMENTS

| | | | | | |
|---|---|---|---|---|---|
| 4,174,683 | A | * | 11/1979 | Vivian | 123/48 C |
| 5,572,959 | A | * | 11/1996 | Hedelin | 123/48 C |
| 2005/0087155 | A1 | * | 4/2005 | Kikori | 123/78 C |

FOREIGN PATENT DOCUMENTS

| | | |
|---|---|---|
| DE | 10 2004 005 751 A1 | 8/2004 |
| EP | 1 318 286 A2 | 6/2003 |
| EP | 1 431 559 A2 | 6/2004 |
| JP | A 5-156953 | 6/1993 |
| JP | A 2003-193872 | 7/2003 |
| JP | A 2004-218522 | 8/2004 |

* cited by examiner

*Primary Examiner* — Erick Solis
(74) *Attorney, Agent, or Firm* — Oliff & Berridge PLC

(57) ABSTRACT

A spark ignition type internal combustion engine comprises a variable compression ratio mechanism able to change a mechanical compression ratio, a variable valve timing mechanism able to control a closing timing of an intake valve, and an air flow control valve controlling an air flow in a cylinder and able to control the amount of intake air fed into a combustion chamber. The mechanical compression ratio is made maximum so as to obtain the maximum expansion ratio at the time of engine low load operation and the actual compression ratio at the time of engine low load operation is made an actual compression ratio substantially the same as that at the time of engine medium and high load operation. When the engine load is in an extremely low load region, the air flow control valve is used to control an amount of intake air fed into the combustion chamber. Due to this, a high heat efficiency can be realized even in a region where the amount of intake air is difficult to control by changing the closing timing of the intake valve.

15 Claims, 16 Drawing Sheets

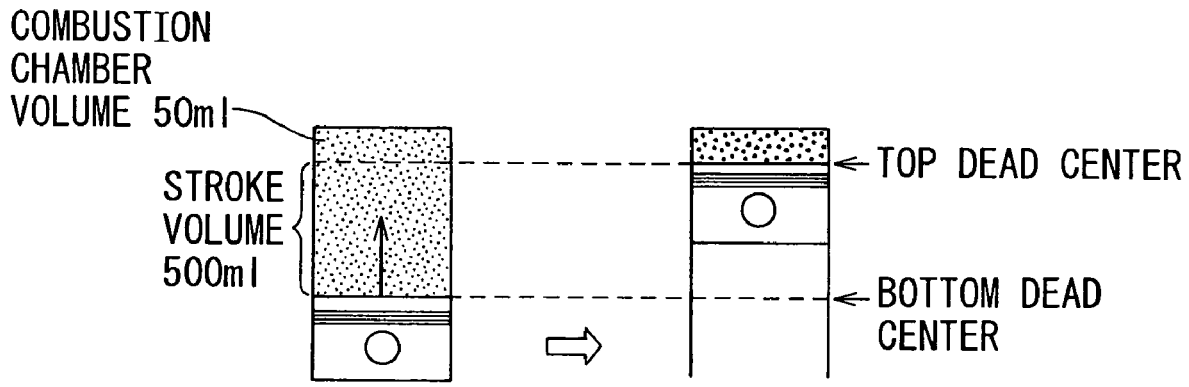

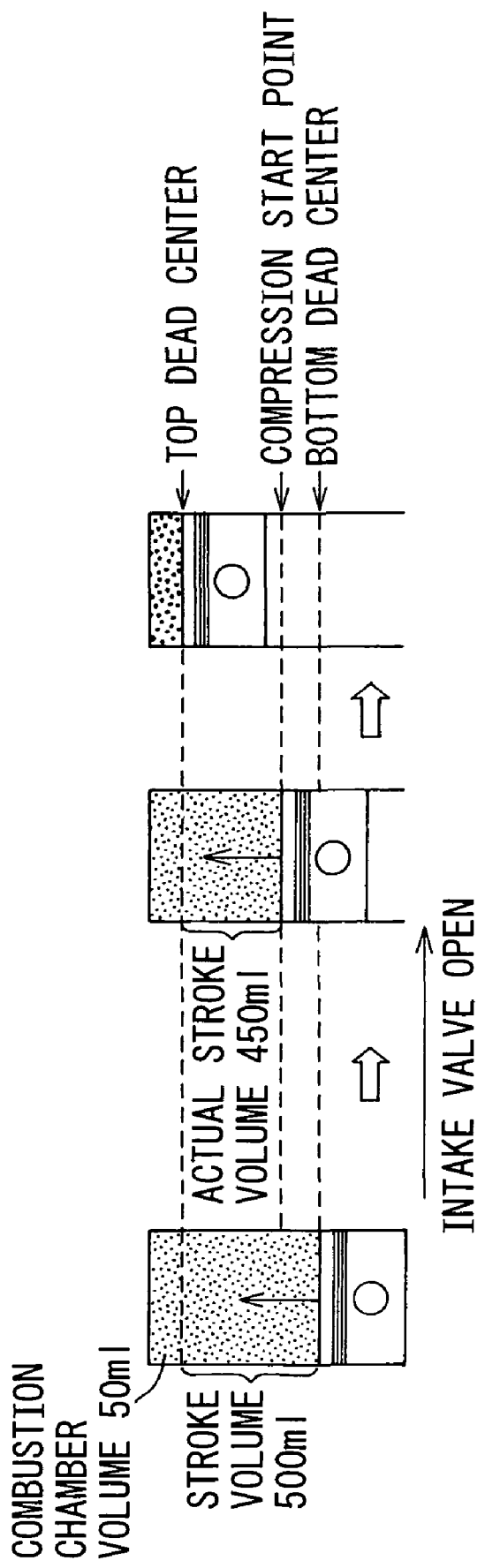

$$\text{EXPANSION RATIO} = \frac{\text{COMBUSTION CHAMBER VOLUME} + \text{STROKE VOLUME}}{\text{COMBUSTION CHAMBER VOLUME}}$$

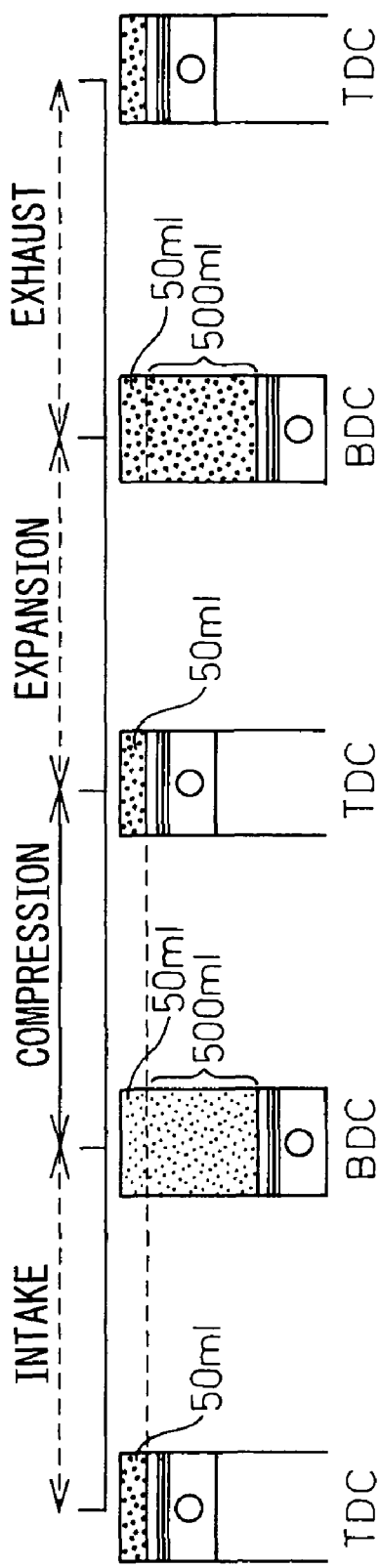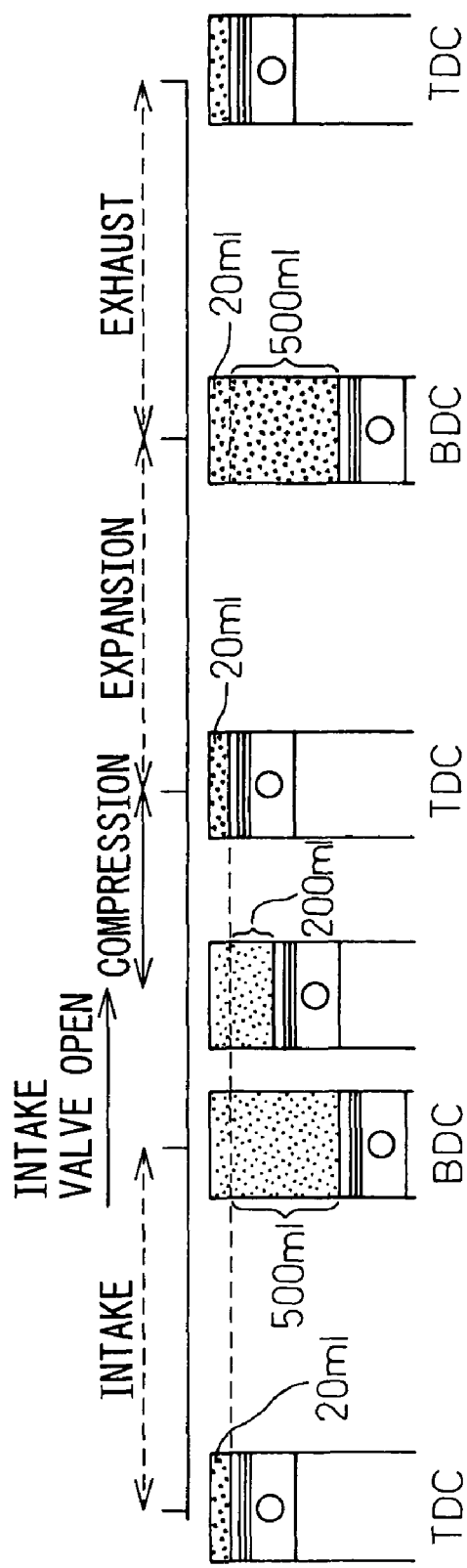

METHOD OF CONTROLLING A MECHANICAL COMPRESSION RATIO, A CLOSING TIMING OF AN INTAKE VALVE AND AIR STREAM

TECHNICAL FIELD

The present invention relates to a spark ignition type internal combustion engine.

BACKGROUND ART

Known in the art is a spark ignition type internal combustion engine provided with a variable compression ratio mechanism able to change a mechanical compression ratio and a variable valve timing mechanism able to control a closing timing of an intake valve, performing a supercharging action by a supercharger at the time of engine medium load operation and engine high load operation and, in the state holding an actual compression ratio fixed at the time of engine medium and high load operation, increasing the mechanical compression ratio and retarding the closing timing of the intake valve as the engine load becomes lower (for example, see Japanese Patent Publication (A) No. 2004-218522).

However, in this internal combustion engine, even at the time of engine low load operation, the mechanical compression ratio is made high and the closing timing of the intake valve is retarded. However, how the amount of intake air fed into the combustion chamber is controlled at the time of engine low load operation is unclear.

Further, generally speaking, in an internal combustion engine, the lower the engine load, the worse the heat efficiency, therefore to improve the heat efficiency at the time of vehicle operation, that is, to improve the fuel efficiency, it becomes necessary to improve the heat efficiency at the time of engine low load operation.

However, in an internal combustion engine, the larger the expansion ratio, the longer the period in an expansion stroke where a downward force acts on the piston, therefore the larger the expansion ratio, the more the heat efficiency is improved. Contrarily, the higher the mechanical compression ratio, the larger the expansion ratio. Therefore to improve the heat efficiency at the time of vehicle operation, it is preferable to raise the mechanical compression ratio at the time of engine low load operation as much as possible to enable the maximum expansion ratio to be obtained at the time of engine low load operation.

Further, in an internal combustion engine, as the opening degree of the throttle valve becomes smaller, the pumping loss becomes larger. This tendency becomes remarkable at the time of engine low load operation. If the pumping loss becomes larger in this way, the heat efficiency drops. Therefore, to improve the heat efficiency at the time of vehicle operation, it is necessary to increase the opening degree of the throttle valve so reduce the pumping loss at the time of engine low load operation. In this way, to increase the opening degree of the throttle valve at the time of engine low load operation, that is, when the amount of intake air to be fed to the combustion chamber is small, it is preferable to change the closing timing of the intake valve in order to control the amount of intake air.

However, there is a limit to changing the closing timing of the intake valve to control the amount of intake air. When the engine load is extremely low, that is, when the amount of intake air to be fed into the combustion chamber is extremely small, it soon becomes difficult to suitably control the amount of intake air by retarding the closing timing of the intake valve.

DISCLOSURE OF INVENTION

Therefore, an object of the present invention is to provide a spark ignition type internal combustion engine able to suitably control the amount of intake air even in a region where suitable control of the amount of intake air is difficult by changing the closing timing of the intake valve.

The present invention provides a spark ignition type internal combustion engine described in the claims as means for realizing the above object.

In an aspect of the present invention, there is provided a spark ignition type internal combustion engine comprising a variable compression ratio mechanism able to change a mechanical compression ratio, a variable valve timing mechanism able to control a closing timing of an intake valve, and an air flow control valve controlling an air flow in a cylinder, wherein the mechanical compression ratio is made maximum so as to obtain the maximum expansion ratio at the time of engine low load operation and the actual compression ratio at the time of engine low load operation is made an actual compression ratio substantially the same as that at the time of engine medium and high load operation, and wherein the air flow control valve is used to control an air flow in a cylinder and an amount of intake air fed into the combustion chamber when the engine load is in an extremely low load region.

In another aspect of the present invention, the closing timing of the intake valve is shifted as the engine load becomes lower in a direction away from intake bottom dead center until a limit closing timing enabling control of the amount of intake air fed into the combustion chamber.

In another aspect of the present invention, the extremely low load region is a region of a load lower than the engine load when the closing timing of the intake valve reaches the limit closing timing.

In another aspect of the present invention, at the extremely low load region, the closing timing of the intake valve is held at the limit closing timing.

In another aspect of the present invention, in a region of a load higher than the engine load when the closing timing of the intake valve reaches the limit closing timing, the amount of intake air fed into the combustion chamber is controlled by changing the closing timing of the intake valve without depending on the air flow control valve and a throttle valve arranged in an engine intake passage.

In another aspect of the present invention, in a region of a load higher than the engine load when the closing timing of the intake valve reaches the limit closing timing, the throttle valve is held in the fully opened state.

In another aspect of the present invention, in a region of a load higher than the engine load when the closing timing of the intake valve reaches the limit closing timing, the air flow control valve is held in the fully opened state.

In another aspect of the present invention, in the extremely low load region, a throttle valve arranged in an engine intake passage is substantially fully opened.

In another aspect of the present invention, in the extremely low load region, the air flow control valve and a throttle valve arranged in an engine intake passage are used to control the amount of intake air.

In another aspect of the present invention, at the extremely low load region, the air flow control valve is made smaller in opening degree as the engine load becomes lower, in the region of a load lower than the engine load when the air flow control valve becomes fully closed, a throttle valve arranged in an engine intake passage is used to control the amount of intake air fed into the combustion chamber.

In another aspect of the present invention, the maximum expansion ratio is 20 or more.

In another aspect of the present invention, at the time of engine low speed, regardless of the engine load, the actual compression ratio is made substantially 9 to 11.

In another aspect of the present invention, the higher the engine speed, the higher the actual compression ratio.

In another aspect of the present invention, the mechanical compression ratio is increased as the engine load becomes lower until a limit mechanical compression ratio.

In another aspect of the present invention, in a region of a load lower than the engine load when the mechanical compression ratio reaches the limit mechanical compression ratio, the mechanical compression ratio is held at the limit mechanical compression ratio.

According to the present invention, it is possible to suitably control the amount of intake air even in a region where suitable control of the amount of intake air is difficult by changing the closing timing of the intake valve, that is, even in the extremely low load region.

BRIEF DESCRIPTION OF THE DRAWINGS

The present invention will be more clearly understood from the description as set below with reference to the accompanying drawings, wherein:

FIGS. 8A, 8B and 8C are views for explaining the mechanical compression ratio, actual compression ratio, and expansion ratio.

FIGS. 10A and 10B are views for explaining a normal cycle and superhigh expansion ratio cycle.

BEST MODE FOR CARRYING OUT THE INVENTION

Figure 1:
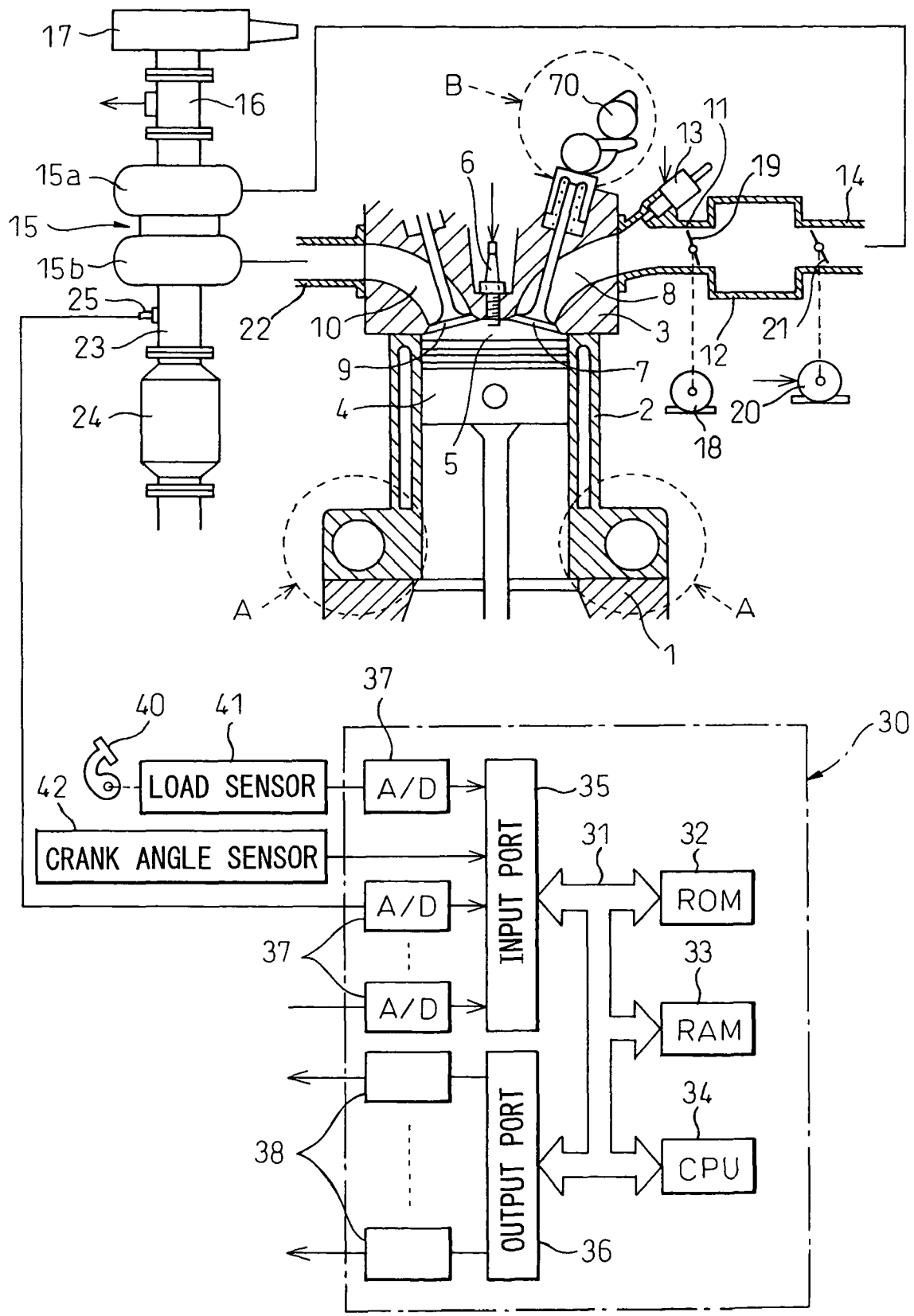
FIG. 1 is an overview of a spark ignition type internal combustion engine.

FIG. 1 shows a side cross-sectional view of a spark ignition type internal combustion engine.

Referring to FIG. 1, 1 indicates a crank case, 2 a cylinder block, 3 a cylinder head, 4 a piston, 5 a combustion chamber, 6 a spark plug arranged at the top center of the combustion chamber 5, 7 an intake valve, 8 an intake port, 9 an exhaust valve, and 10 an exhaust port. The intake port 8 is connected through an intake tube 11 to a surge tank 12, while each intake tube 11 is provided with a fuel injector 13 for injecting fuel toward a corresponding intake port 8. Note that each fuel injector 13 may be arranged at each combustion chamber 5 instead of being attached to each intake tube 11.

The surge tank 12 is connected via an intake duct 14 to an outlet of the compressor 15a of the exhaust turbocharger 15, while an inlet of the compressor 15a is connected through an intake air amount detector 16 using for example a heating wire to an air cleaner 17. The intake tube 11 is provided inside it with a swirl control valve (SCV) 19 driven by an actuator 18, while the intake duct 14 is provided inside it with a throttle valve 21 driven by an actuator 20.

On the other hand, the exhaust port 10 is connected through an exhaust manifold 22 to an inlet of an exhaust turbine 15b of the exhaust turbocharger 15, while an outlet of the exhaust turbine 15b is connected through an exhaust pipe 23 to for example a catalytic converter 24 housing a three-way catalyst. The exhaust pipe 23 has an air-fuel ratio sensor 25 arranged inside it.

Further, in the embodiment shown in FIG. 1, the connecting part of the crank case 1 and the cylinder block 2 is provided with a variable compression ratio mechanism A able to change the relative positions of the crank case 1 and cylinder block 2 in the cylinder axial direction so as to change the volume of the combustion chamber 5 when the piston 4 is positioned at compression top dead center and is further provided with a variable valve timing mechanism B able to control the closing timing of the intake valve 7 so as to change the start timing of the actual compression action.

The electronic control unit 30 is comprised of a digital computer provided with components connected with each other through a bidirectional bus 31 such as a ROM (read only memory) 32, RAM (random access memory) 33, CPU (microprocessor) 34, input port 35, and output port 36. The output signal of the intake air amount detector 16 and the output signal of the air-fuel ratio sensor 25 are input through the corresponding AD converter 37 to the input port 35. Further, the accelerator pedal 40 is connected to a load sensor 41 generating an output voltage proportional to the amount of depression L of the accelerator pedal 40. The output voltage of the load sensor 41 is input through a corresponding AD converter 37 to the input port 35. Further, the input port 35 is connected to a crank angle sensor 42 generating an output pulse every time the crankshaft rotates by for example 30°. On the other hand, the output port 36 is connected through the drive circuit 38 to a spark plug 6, fuel injector 13, swirl control valve drive actuator 18, throttle valve drive actuator 20, variable compression ratio mechanism A, and variable valve timing mechanism B.

Figure 2:
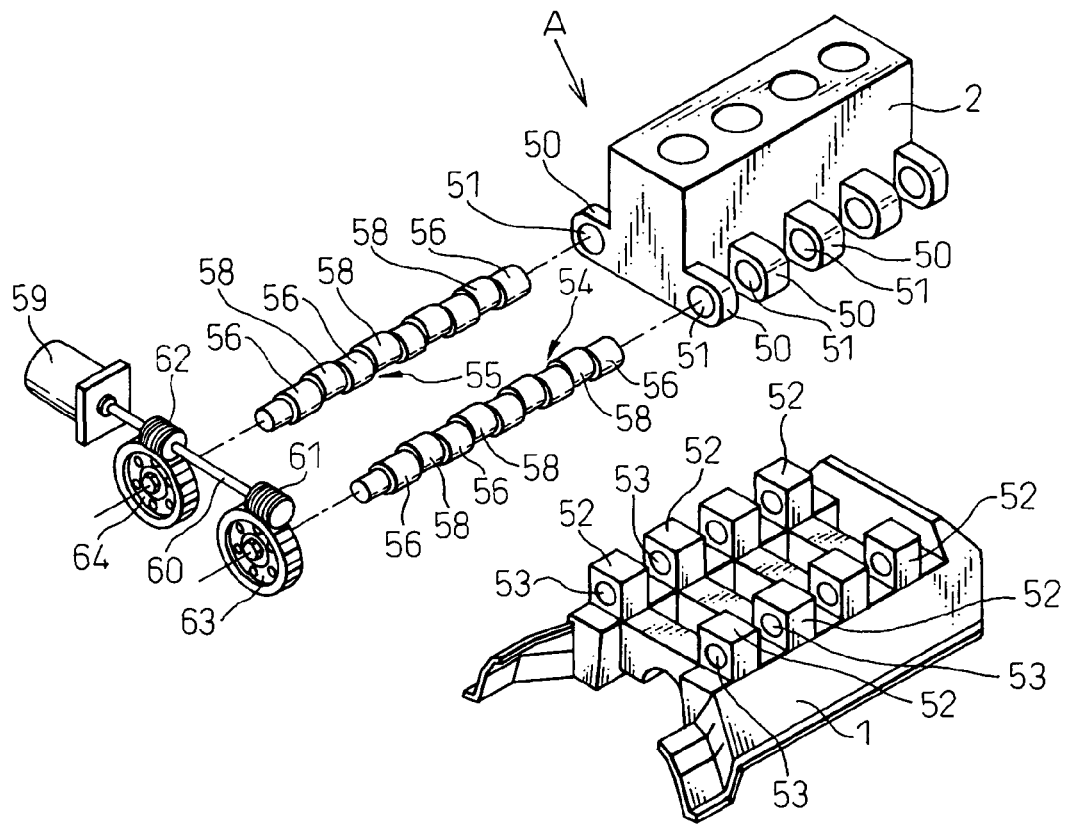
FIG. 2 is a disassembled perspective view of a variable compression ratio mechanism.
Figure 3A:
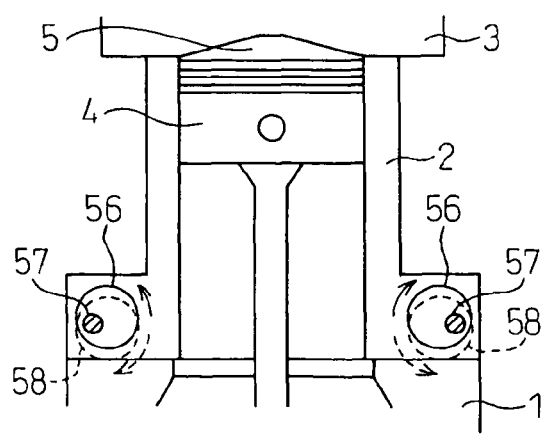
FIGS. 3A and 3B are side cross-sectional views of the illustrated internal combustion engine.
Figure 3B:
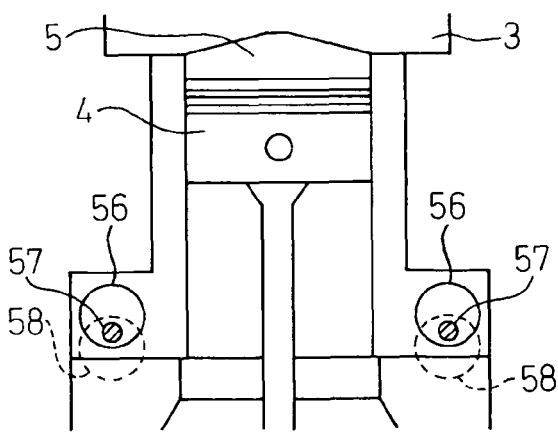

FIG. 2 is a disassembled perspective view of the variable compression ratio mechanism A shown in FIG. 1, while FIGS. 3A and 3B are side cross-sectional views of the illustrated internal combustion engine. Referring to FIG. 2, at the bottom of the two side walls of the cylinder block 2, a plurality of projecting parts 50 separated from each other by a certain distance are formed. Each projecting part 50 is formed with a circular cross-section cam insertion hole 51. On the other hand, the top surface of the crank case 1 is formed with a plurality of projecting parts 52 separated from each other by a certain distance and fitting between the corresponding projecting parts 50. These projecting parts 52 are also formed with circular cross-section cam insertion holes 53.

As shown in FIG. 2, a pair of cam shafts 54, 55 is provided. Each of the cam shafts 54, 55 has circular cams 56 fixed on it able to be rotatably inserted in the cam insertion holes 51 at every other position. These circular cams 56 are coaxial with the axes of rotation of the cam shafts 54, 55. On the other hand, between the circular cams 56, as shown by the hatching in FIGS. 3A and 3B, extend eccentric shafts 57 arranged eccentrically with respect to the axes of rotation of the cam shafts 54, 55. Each eccentric shaft 57 has other circular cams 58 rotatably attached to it eccentrically. As shown in FIG. 2, these circular cams 58 are arranged between the circular cams 56. These circular cams 58 are rotatably inserted in the corresponding cam insertion holes 53.

When the circular cams 56 fastened to the cam shafts 54, 55 are rotated in opposite directions from each other as shown by the solid line arrows in FIG. 3A from the state shown in FIG. 3A, the eccentric shafts 57 move toward the bottom center, so the circular cams 58 rotate in the opposite directions from the circular cams 56 in the cam insertion holes 53 as shown by the broken line arrows in FIG. 3A. As shown in FIG. 3B, when the eccentric shafts 57 move toward the bottom center, the centers of the circular cams 58 move to below the eccentric shafts 57.

As will be understood from a comparison of FIGS. 3A and 3B, the relative positions of the crank case 1 and cylinder block 2 are determined by the distance between the centers of the circular cams 56 and the centers of the circular cams 58. The larger the distance between the centers of the circular cams 56 and the centers of the circular cams 58, the further the cylinder block 2 from the crank case 1. If the cylinder block 2 moves further away from the crank case 1, the volume of the combustion chamber 5 when the piston 4 is positioned at compression top dead center increases. Therefore, by making the cam shafts 54, 55 rotate, the volume of the combustion chamber 5 when the piston 4 is positioned at compression top dead center can be changed.

As shown in FIG. 2, to make the cam shafts 54, 55 rotate in opposite directions, the shaft of a drive motor 59 is provided with a pair of worm gears 61, 62 with opposite thread directions. Gears 63, 64 engaging with these worm gears 61, 62 are fastened to ends of the cam shafts 54, 55. In this embodiment, the drive motor 59 may be driven to change the volume of the combustion chamber 5 when the piston 4 is positioned at compression top dead center over a broad range. Note that the variable compression ratio mechanism A shown from FIGS. 1 to 3 shows an example. Any type of variable compression ratio mechanism may be used.

Figure 4:
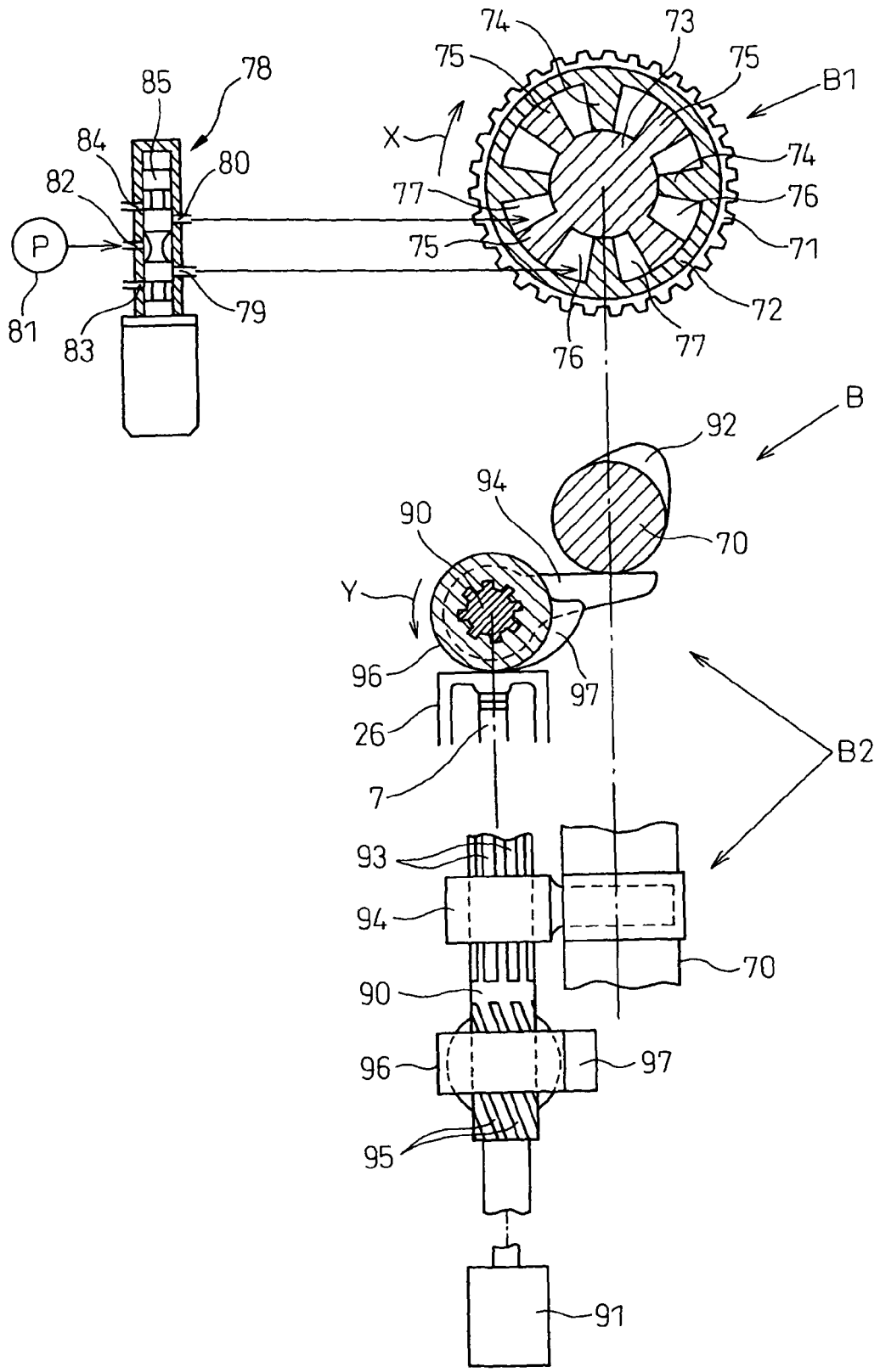
FIG. 4 is a view of a variable valve timing mechanism.

Further, FIG. 4 shows a variable valve timing mechanism B attached to the cam shaft 70 for driving the intake valve 7 in FIG. 1. As shown in FIG. 4, the variable valve timing mechanism B is comprised of a cam phase changer B1 attached to one end of the cam shaft 70 and changing the phase of the cam of the cam shaft 70 and a cam actuation angle changer B2 arranged between the cam shaft 70 and the valve lifter 26 of the intake valve 7 and changing the actuation angle (working angle) of the cams of the cam shaft 70 to different actuation angles for transmission to the intake valve 7. Note that FIG. 4 is a side sectional view and plan view of the cam actuation angle changer B2.

First, explaining the cam phase changer B1 of the variable valve timing mechanism B, this cam phase changer B1 is provided with a timing pulley 71 made to rotate by an engine crank shaft through a timing belt in the arrow direction, a cylindrical housing 72 rotating together with the timing pulley 71, a shaft 73 able to rotate together with a cam shaft 70 and rotate relative to the cylindrical housing 72, a plurality of partitions 74 extending from an inside circumference of the cylindrical housing 72 to an outside circumference of the shaft 73, and vanes 75 extending between the partitions 74 from the outside circumference of the shaft 73 to the inside circumference of the cylindrical housing 72, the two sides of the vanes 75 formed with advancing use hydraulic chambers 76 and retarding use hydraulic chambers 77.

The feed of working oil to the hydraulic chambers 76, 77 is controlled by a working oil feed control valve 78. This working oil feed control valve 78 is provided with hydraulic ports 79, 80 connected to the hydraulic chambers 76, 77, a feed port 82 for working oil discharged from a hydraulic pump 81, a pair of drain ports 83, 84, and a spool valve 85 for controlling connection and disconnection of the ports 79, 80, 82, 83, 84.

To advance the phase of the cams of the cam shaft 70, the spool valve 85 is made to move to downward in FIG. 4, working oil fed from the feed port 82 is fed through the hydraulic port 79 to the advancing use hydraulic chambers 76, and working oil in the retarding use hydraulic chambers 77 is drained from the drain port 84. At this time, the shaft 73 is made to rotate relative to the cylindrical housing 72 in the arrow X-direction.

As opposed to this, to retard the phase of the cam of the cam shaft 70, the spool valve 85 is made to move upward in FIG. 4, working oil fed from the feed port 82 is fed through the hydraulic port 80 to the retarding use hydraulic chambers 77, and working oil in the advancing use hydraulic chambers 76 is drained from the drain port 83. At this time, the shaft 73 is made to rotate relative to the cylindrical housing 72 in the direction opposite to the arrows X.

Figure 5A:
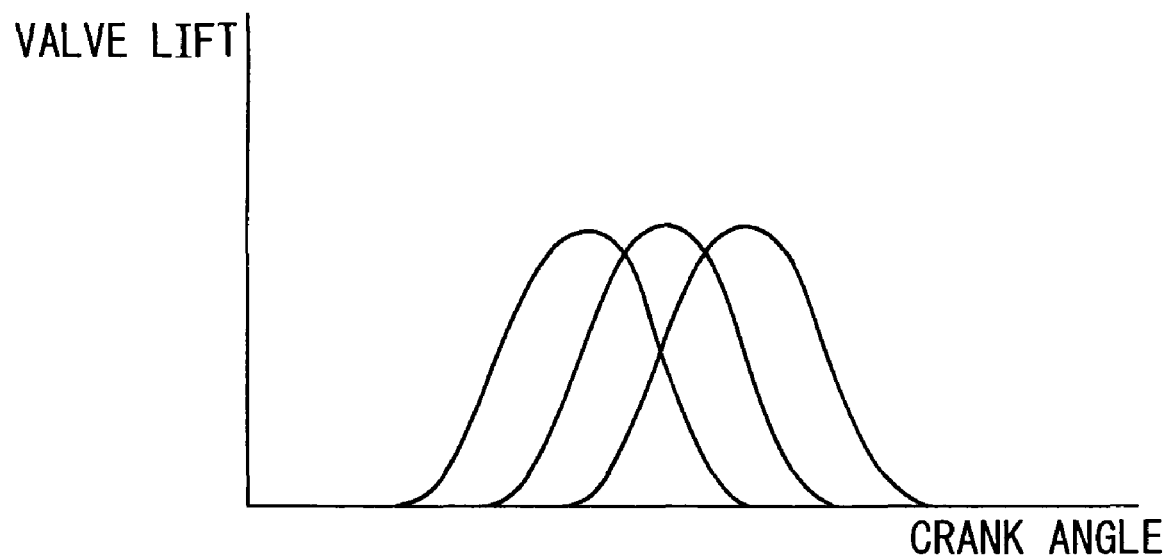
FIGS. 5A and 5B are views showing the amounts of lift of the intake valve.

When the shaft 73 is made to rotate relative to the cylindrical housing 72, if the spool valve 85 is returned to the neutral position shown in FIG. 4, the operation for relative rotation of the shaft 73 is ended, and the shaft 73 is held at the relative rotational position at that time. Therefore, it is possible to use the cam phase changer B1 so as to advance or retard the phase of the cam of the cam shaft 70 by exactly the desired amount as shown in FIG. 5. That is, the cam phase changer B1 can freely advance or retard the opening timing of the intake valve 7.

Next, explaining the cam actuation angle changer B2 of the variable valve timing mechanism B, this cam actuation angle changer B2 is provided with a control rod 90 arranged in parallel with the cam shaft 70 and made to move by an actuator 91 in the axial direction, an intermediate cam 94 engaging with a cam 92 of the cam shaft 70 and slidably fitting with a spline 93 formed on the control rod 90 and extending in the axial direction, and a pivoting cam 96 engaging with a valve lifter 26 for driving the intake valve 7 and slidably fitting with a spline 95 extending in a spiral formed on the control rod 90. The pivoting cam 96 is formed with a cam 97.

When the cam shaft 70 rotates, the cam 92 causes the intermediate cam 94 to pivot by exactly a constant angle at all times. At this time, the pivoting cam 96 is also made to pivot by exactly a constant angle. On the other hand, the intermediate cam 94 and pivoting cam 96 are supported not movably in the axial direction of the control rod 90, therefore when the control rod 90 is made to move by the actuator 91 in the axial direction, the pivoting cam 96 is made to rotate relative to the intermediate cam 94.

Figure 5B:
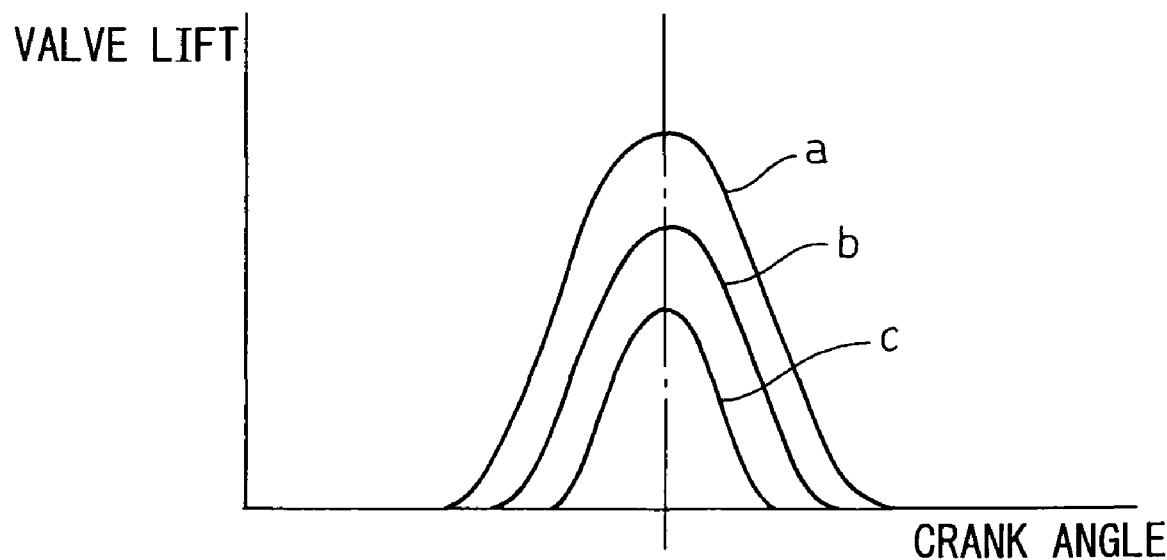

When the cam 92 of the cam shaft 70 starts to engage with the intermediate cam 94 due to the relative rotational positional relationship between the intermediate cam 94 and pivoting cam 96, if the cam 97 of the pivoting cam 96 starts to engage with the valve lifter 26, as shown by a in FIG. 5B, the opening time period and amount of lift of the intake valve 7 become maximum. As opposed to this, when the actuator 91 is used to make the pivoting cam 96 rotate relative to the intermediate cam 94 in the arrow Y-direction of FIG. 4, the cam 92 of the cam shaft 70 engages with the intermediate cam 94, then after a while the cam 97 of the pivoting cam 96 engages with the valve lifter 26. In this case, as shown by b in FIG. 5B, the opening time period and amount of lift of the intake valve 7 become smaller than a.

When the pivoting cam 96 is made to rotate relative to the intermediate cam 94 in the arrow Y-direction of FIG. 4, as shown by c in FIG. 5B, the opening time period and amount of lift of the intake valve 7 become further smaller. That is, by using the actuator 91 to change the relative rotational position of the intermediate cam 94 and pivoting cam 96, the opening time period of the intake valve 7 can be freely changed. However, in this case, the amount of the lift of the intake valve 7 becomes smaller the shorter the opening time of the intake valve 7.

The cam phase changer B1 can be used to freely change the opening timing of the intake valve 7 and the cam actuation angle changer B2 can be used to freely change the opening time period of the intake valve 7 in this way, so both the cam phase changer B1 and cam actuation angle changer B2, that is, the variable valve timing mechanism B, may be used to freely change the opening timing and opening time period of the intake valve 7, that is, the opening timing and closing timing of the intake valve 7.

Note that the variable valve timing mechanism B shown in FIGS. 1 and 4 show an example. It is also possible to use various types of variable valve timing mechanisms other than the example shown in FIGS. 1 and 4.

Figure 6:
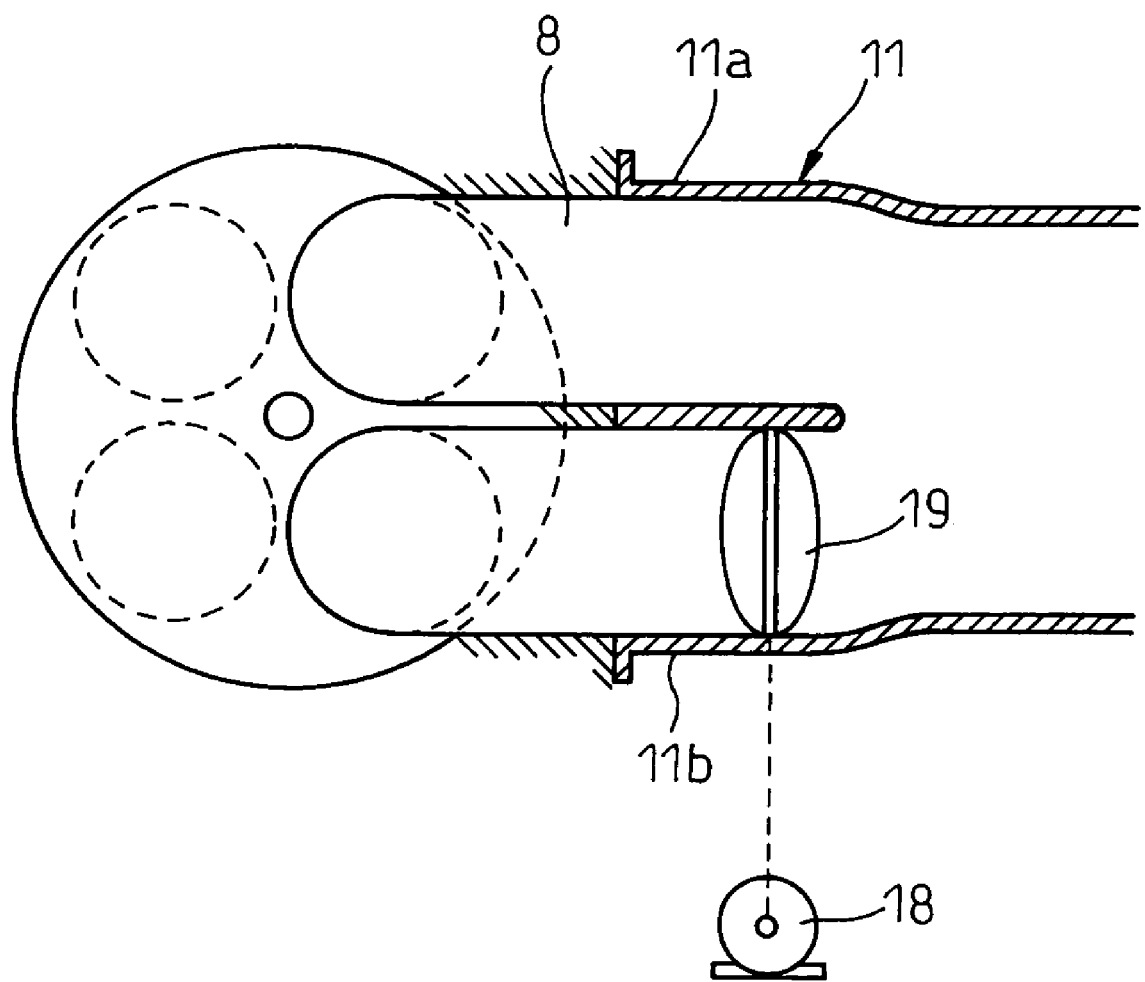
FIG. 6 is a schematic view of an intake port and an intake tube.

FIG. 6 is a schematic view of the intake ports 8 and intake tube 11 connected to one cylinder. Referring to FIG. 6, the intake tube 11 is branched into the two branch tubes 11a and 11b at its downstream end. The branch tubes 11a, 11b are connected to respective intake ports 8. Further the two intake ports 8 connected to the branch tubes 11a, 11b are connected to the same cylinder.

The branch tube 11b among the two branch tubes 11a, 11b is provided with a swirl control valve 19. The swirl control valve 19 can control the flow rate of air passing through the branch tube 11b. Along with this, it can adjust the strength of the swirl formed inside the combustion chamber 5.

Figure 7A:
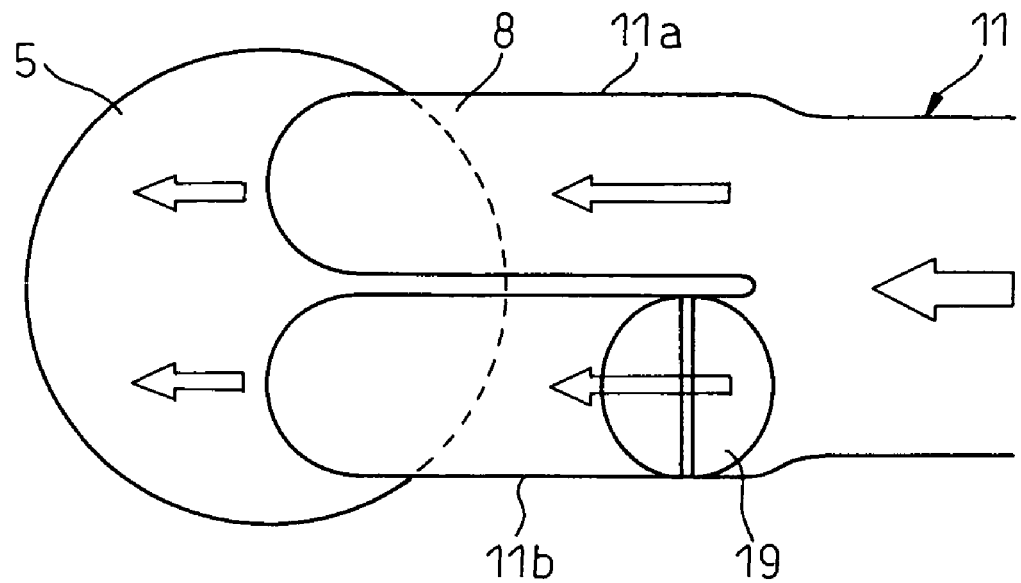
FIGS. 7A and 7B are views showing the flow of air into a combustion chamber.
Figure 7B:
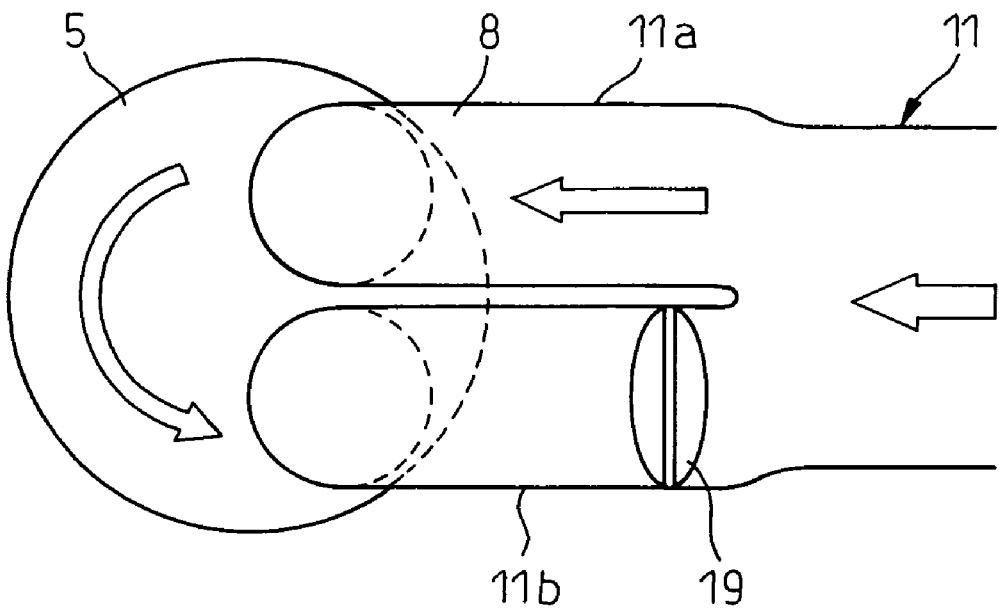

FIG. 7A shows the flow of air flowing into the combustion chamber 5 when fully opening the swirl control valve 19, while FIG. 7B shows the flow when fully closing the swirl control valve 19. The arrows in the figures show the flow of air. As shown in FIG. 7A, when the swirl control valve 19 is fully opened, air flows to both the branch tubes 11a, 11b, so substantially the same amounts of air are made to flow into the combustion chamber 5 from the two intake ports 8. At this time, the air flowing in from one intake port 8 interferes with air flowing in from the other intake port 8, so a swirl is hard to form inside the combustion chamber 5.

On the other hand, as shown in FIG. 7B, when the swirl control valve 19 is fully closed, air will not flow into the branch tube 11b, therefore air can be made to flow into the combustion chamber 5 from only the branch tube 11a not provided with the swirl control valve 19. The air flowing into the combustion chamber 5 is made to flow along the walls of the combustion chamber 5, so inside the combustion chamber 5, a swirling flow of air as shown in FIG. 7B, that is, a swirl, is formed.

Further, as will be understood from FIG. 7B, when closing the swirl control valve 19, air will only be able to flow through the one branch tube 11a among the two branch tubes 11a and 11b, so the passage through which the air can pass will be throttled. That is, by changing the opening degree of the swirl control valve 19, the flow rate of the air passing through the intake tube 11 is changed. As a result, the amount of intake air fed to the combustion chamber 5 can be changed. In particular, in the present embodiment, the swirl control valve 19 can be continuously controlled between fully opened and fully closed, so by controlling the opening degree of the swirl control valve 19, the amount of intake air fed to the combustion chamber 5 can be continuously changed.

Note that in the present embodiment, as the air flow control means for controlling the flow of air occurring inside the combustion chamber 5, the swirl control valve 19 is used, but it is possible to use any means so long as it can control the flow of air occurring inside the combustion chamber 5 and can control to a certain extent the amount of intake air fed to the combustion chamber 5 (that is, can act as a throttle). As such a means, for example, a tumble control valve etc. may be considered.

Figure 8C:
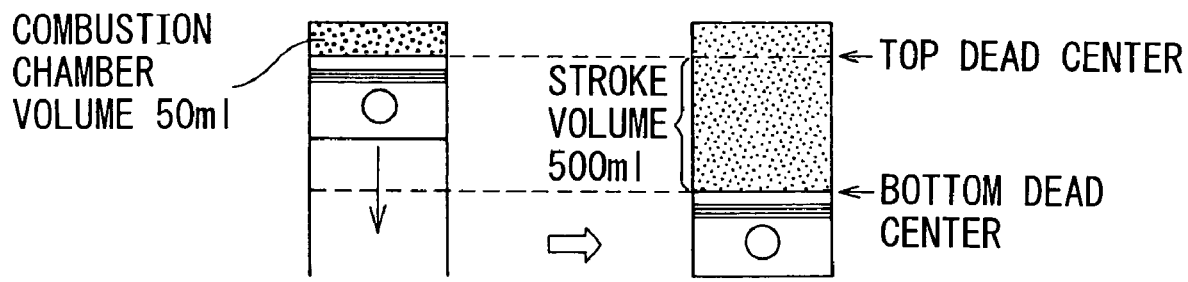

Next, the meaning of the terms used in the present application will be explained with reference to FIGS. 8A to 8C. Note that FIGS. 8A, 8B and 8C show for explanatory purposes an engine with a volume of the combustion chambers of 50 ml and a stroke volume of the piston of 500 ml. In these FIGS. 8A, 8B and 8C, the combustion chamber volume shows the volume of the combustion chamber when the piston is at compression top dead center.

FIG. 8A explains the mechanical compression ratio. The mechanical compression ratio is a value determined mechanically from the stroke volume of the piston and combustion chamber volume at the time of a compression stroke. This mechanical compression ratio is expressed by (combustion chamber volume+stroke volume)/combustion chamber volume. In the example shown in FIG. 8A, this mechanical compression ratio becomes (50 ml+500 ml)/50 ml=11.

FIG. 8B explains the actual compression ratio. This actual compression ratio is a value determined from the actual stroke volume of the piston from when the compression action is actually started to when the piston reaches top dead center and the combustion chamber volume. This actual compression ratio is expressed by (combustion chamber volume+actual stroke volume)/combustion chamber volume. That is, as shown in FIG. 8B, even if the piston starts to rise in the compression stroke, no compression action is performed while the intake valve is opened. The actual compression action is started after the intake valve closes. Therefore, the actual compression ratio is expressed as follows using the actual stroke volume. In the example shown in FIG. 8B, the actual compression ratio becomes (50 ml+450 ml)/50 ml=10.

FIG. 8C explains the expansion ratio. The expansion ratio is a value determined from the stroke volume of the piston at the time of an expansion stroke and the combustion chamber volume. This expansion ratio is expressed by the (combustion chamber volume+stroke volume)/combustion chamber volume. In the example shown in FIG. 8C, this expansion ratio becomes (50 ml+500 ml)/50 ml=11.

Next, the most basic features of the present invention will be explained with reference to FIGS. 9, 10A and 10B. Note that FIG. 9 shows the relationship between the theoretical thermal efficiency and the expansion ratio, while FIGS. 10A and 10B show a comparison between the normal cycle and superhigh expansion ratio cycle used selectively in accordance with the load in the present invention.

FIG. 10A shows the normal cycle in which the intake valve closes near the bottom dead center and the compression action by the piston is started from near substantially compression bottom dead center. In the example shown in this FIG. 10A as well, in the same way as the examples shown in FIGS. 8A, 8B and 8C, the combustion chamber volume is made 50 ml, and the stroke volume of the piston is made 500 ml. As will be understood from FIG. 10A, in a normal cycle, the mechanical compression ratio is (50 ml+500 ml)/50 ml=11, the actual compression ratio is also about 11, and the expansion ratio also becomes (50 ml+500 ml)/50 ml=11. That is, in an ordinary internal combustion engine, the mechanical compression ratio and actual compression ratio and the expansion ratio become substantially equal.

Figure 9:
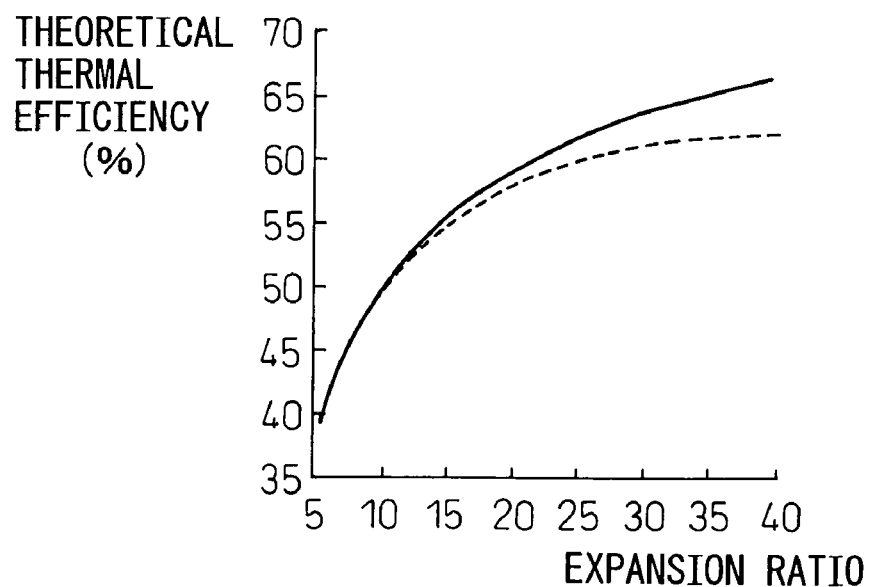
FIG. 9 is a view showing the relationship between the theoretical thermal efficiency and expansion ratio.

The solid line in FIG. 9 shows the change in the theoretical thermal efficiency in the case where the actual compression ratio and expansion ratio are substantially equal, that is, in the normal cycle. In this case, it is learned that the larger the expansion ratio, that is, the higher the actual compression ratio, the higher the theoretical thermal efficiency. Therefore, in a normal cycle, to raise the theoretical thermal efficiency, the actual compression ratio should be made higher. However, due to the restrictions on the occurrence of knocking at the time of engine high load operation, the actual compression ratio can only be raised even at the maximum to about 12, accordingly, in a normal cycle, the theoretical thermal efficiency cannot be made sufficiently high.

On the other hand, under this situation, the inventors strictly differentiated between the mechanical compression ratio and actual compression ratio and studied the theoretical thermal efficiency and as a result discovered that in the theoretical thermal efficiency, the expansion ratio is dominant, and the theoretical thermal efficiency is not affected much at all by the actual compression ratio. That is, if raising the actual compression ratio, the explosive force rises, but compression requires a large energy, accordingly even if raising the actual compression ratio, the theoretical thermal efficiency will not rise much at all.

As opposed to this, if increasing the expansion ratio, the longer the period during which a force acts pressing down the piston at the time of the expansion stroke, the longer the time that the piston gives a rotational force to the crankshaft. Therefore, the larger the expansion ratio is made, the higher the theoretical thermal efficiency becomes. The broken line in FIG. 9 shows the theoretical thermal efficiency in the case of fixing the actual compression ratio at 10 and raising the expansion ratio in that state. In this way, it is learned that the amount of rise of the theoretical thermal efficiency when raising the expansion ratio in the state where the actual compression ratio is maintained at a low value and the amount of rise of the theoretical thermal efficiency in the case where the actual compression ratio is increased along with the expansion ratio as shown by the solid line of FIG. 9 will not differ that much.

If the actual compression ratio is maintained at a low value in this way, knocking will not occur, therefore if raising the expansion ratio in the state where the actual compression ratio is maintained at a low value, the occurrence of knocking can be prevented and the theoretical thermal efficiency can be greatly raised. FIG. 10B shows an example of the case when using the variable compression ratio mechanism A and variable valve timing mechanism B to maintain the actual compression ratio at a low value and raise the expansion ratio.

Referring to FIG. 10B, in this example, the variable compression ratio mechanism A is used to lower the combustion chamber volume from 50 ml to 20 ml. On the other hand, the variable valve timing mechanism B is used to retard the closing timing of the intake valve until the actual stroke volume of the piston changes from 500 ml to 200 ml. As a result, in this example, the actual compression ratio becomes (20 ml+200 ml)/20 ml=11 and the expansion ratio becomes (20 ml+500 ml)/20 ml=26. In the normal cycle-shown in FIG. 10A, as explained above, the actual compression ratio is about 11 and the expansion ratio is 11. Compared with this case, in the case shown in FIG. 10B, it is learned that only the expansion ratio is raised to 26. This will be called the "superhigh expansion ratio cycle" below.

As explained above, generally speaking, in an internal combustion engine, the lower the engine load, the worse the heat efficiency, therefore to improve the heat efficiency at the time of vehicle operation, that is, to improve the fuel efficiency, it becomes necessary to improve the heat efficiency at the time of engine low load operation. On the other hand, in the superhigh expansion ratio cycle shown in FIG. 10B, the actual stroke volume of the piston at the time of the compression stroke is made smaller, so the amount of intake air which can be sucked into the combustion chamber 5 becomes smaller, therefore this superhigh expansion ratio cycle can only be employed when the engine load is relatively low. Therefore, in the present invention, at the time of engine low load operation, the superhigh expansion ratio cycle shown in FIG. 10B is set, while at the time of engine high load operation, the normal cycle shown in FIG. 10A is set. This is the basic feature of the present invention.

Figure 11:
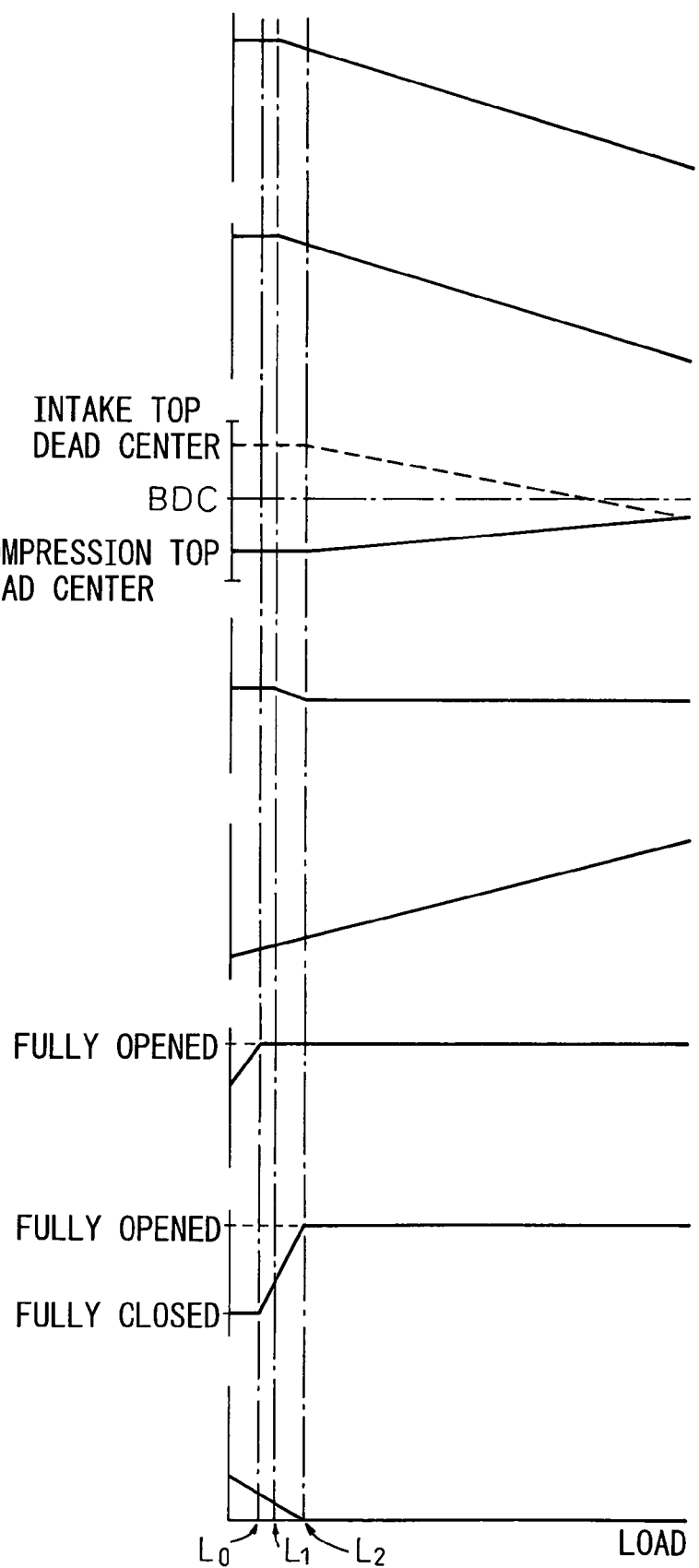
FIG. 11 is a view showing the change in mechanical compression ratio etc. in accordance with the engine load.

FIG. 11 shows the operational control as a whole at the time of steady operation at a low engine speed. Below, the operational control as a whole will be explained with reference to FIG. 11.

FIG. 11 shows the changes in the mechanical compression ratio, expansion ratio, closing timing of the intake valve 7, actual compression ratio, the amount of intake air, opening degree of the throttle valve 17, opening degree of the swirl control valve (SCV) 19, and pumping loss, along with the engine load. Note that in the embodiment according to the present invention, to enable the three-way catalyst in the catalytic converter 24 to simultaneously reduce the unburned HC, CO, and $NO_x$ in the exhaust gas, ordinarily the average air-fuel ratio in the combustion chamber 5 is feedback controlled to the stoichiometric air-fuel ratio based on the output signal of the air-fuel ratio sensor 25.

Now, as explained above, at the time of engine high load operation, the normal cycle shown in FIG. 10A is executed. Therefore, as shown in FIG. 11, at this time, the mechanical compression ratio is made low, so the expansion ratio becomes low and, as shown by the solid line in FIG. 11, the closing timing of the intake valve 7 is advanced. Further, at this time, the amount of intake air is large. At this time, the opening degrees of the swirl control valve 19 and the throttle valve 21 are maintained fully opened or substantially fully opened, so the pumping loss becomes zero.

On the other hand, as shown in FIG. 11, along with the reduction in the engine load, the mechanical compression ratio is increased, therefore the expansion ratio is also increased. Further, at this time, the actual compression ratio is held substantially constant by, as shown by the solid line in FIG. 11, retarding the closing timing of the intake valve 7 as the engine load becomes lower. Note that at this time as well, the swirl control valve 19 and throttle valve 21 are held at the fully opened or substantially fully opened state, therefore the amount of intake air fed to the combustion chamber 5 is controlled not by the throttle valve 21 but by changing the closing timing of the intake valve 7. At this time as well, the pumping loss becomes zero.

In this way, when the engine load becomes lower from the engine high load operating state, the mechanical compression ratio is increased along with the fall in the amount of intake air under a substantially constant actual compression ratio. That is, the volume of the combustion chamber 5 when the piston 4 reaches compression top dead center is reduced proportionally to the reduction in the amount of intake air. Therefore the volume of the combustion chamber 5 when the piston 4 reaches compression top dead center changes proportionally to the amount of intake air. Note that at this time, the air-fuel ratio in the combustion chamber 5 becomes the stoichiometric air-fuel ratio, so the volume of the combustion chamber 5 when the piston 4 reaches compression top dead center changes proportionally to the amount of fuel.

If the engine load becomes further lower, the mechanical compression ratio is further increased. When the mechanical compression ratio reaches the limit mechanical compression ratio corresponding to the structural limit of the combustion chamber 5, in the region of a load lower than the engine load L1 when the mechanical compression ratio reaches the limit mechanical compression ratio, the mechanical compression ratio is held at the limit mechanical compression ratio. Therefore at the time of engine low load operation, the mechanical compression ratio becomes maximum, and the expansion ratio also becomes maximum. Putting this another way, in the present invention, so as to obtain the maximum expansion ratio at the time of engine low load operation, the mechanical compression ratio is made maximum. Further, at this time, the actual compression ratio is maintained at an actual compression ratio substantially the same as that at the time of engine medium and high load operation.

On the other hand, as shown by the solid line in FIG. 11, the closing timing of the intake valve 7 is retarded further to the limit closing timing enabling control of the amount of intake air fed to the combustion chamber 5 the more the engine load becomes lower. In the region of a load lower than the engine load $L_2$ when the closing timing of the intake valve 7 reaches the limit closing timing (hereinafter referred to as the "extremely low load region"), the closing timing of the intake valve 7 is held at the limit closing timing. If the closing timing of the intake valve 7 is held at the limit closing timing, the amount of intake air will no longer be able to be controlled by the change of the closing timing of the intake valve 7. Therefore, the amount of intake air has to be controlled by some other method.

In the embodiment shown in FIG. 11, at this time, that is, in the extremely low load region, the swirl control valve 19 and the throttle valve 21 are used to control the amount of intake air fed to the combustion chamber 5.

Specifically, as the engine load becomes lower from the engine load $L_2$, first, the opening degree of the swirl control valve 19 is gradually made smaller. During this time, the throttle valve 21 is held at the fully opened or substantially fully opened state, therefore the amount of intake air fed to the combustion chamber 5 is controlled by the swirl control valve 19.

Further, the opening degree of the swirl control valve 19 is made smaller up to zero or substantially zero as the engine load becomes lower. In the region of a load lower than the engine load $L_0$ when the opening degree of the swirl control valve 19 reaches zero or substantially zero, the opening degree of the swirl control valve 19 is held at zero or substantially zero. If the opening degree of the swirl control valve 19 is held at zero or substantially zero, the swirl control valve 19 can no longer be used to control the amount of intake air.

Therefore, in the region of a load lower than the engine load $L_0$ when the opening degree of the swirl control valve 19 reaches zero or substantially zero, the throttle valve 21 is used to control the amount of intake air fed to the combustion chamber 5. However, if using the swirl control valve 19 and throttle valve 21 to control the amount of intake air, as shown in FIG. 11, the pumping loss increases.

Note that to keep the occurrence of the pumping loss to a minimum, in the region of a load lower than the engine load $L_0$ when the opening degree of the swirl control valve 19 reaches zero or substantially zero, the air-fuel ratio may be made larger the lower the engine load in the state holding the throttle valve 21 fully opened or substantially fully opened. At this time, the fuel injector 13 is preferably arranged in the combustion chamber 5 to perform stratified combustion.

As shown in FIG. 11, at the time of engine low speed, regardless of the engine load, the actual compression ratio is held substantially constant. The actual compression ratio at this time is made the range of the actual compression ratio about at the time of engine medium and high load operation ±10 percent, preferably ±5 percent. Note that in the embodiment of the present invention, the actual compression ratio at the time of engine low speed is made about 10±1, that is, from 9 to 11. However, if the engine speed becomes higher, the air-fuel mixture in the combustion chamber 5 is disturbed, so knocking becomes harder to occur, therefore in the embodiment according to the present invention, the higher the engine speed, the higher the actual compression ratio.

On the other hand, as explained above, in the superhigh expansion ratio cycle shown in FIG. 10B, the expansion ratio is made 26. The higher this expansion ratio, the better, but if 20 or more, a considerably high theoretical thermal efficiency can be obtained.

Therefore, in the present invention, the variable compression ratio mechanism A is formed so that the expansion ratio becomes 20 or more.

Further, in the example shown in FIG. 11, the mechanical compression ratio is changed continuously in accordance with the engine load. However, the mechanical compression ratio can also be changed in stages in accordance with the engine load.

On the other hand, as shown by the broken line in FIG. 11, as the engine load becomes lower, by advancing the closing timing of the intake valve 7 as well, it is possible to control the amount of intake air without depending on the throttle valve 21 and swirl control valve 19. Therefore, in FIG. 11, if comprehensively expressing both the case shown by the solid line and the case shown by the broken line, in the embodiment according to the present invention, the closing timing of the intake valve 7 is shifted, as the engine load becomes lower, in a direction away from compression bottom dead center BDC until the limit closing timing $L_2$ enabling control of the amount of intake air fed into the combustion chamber. Note that in the following explanation, only the case of retarding the closing timing of the intake valve 7 as the engine load becomes lower (case of solid line of FIG. 11) will be explained, but the same is true in the case of advancing the closing timing of the intake valve 7 as the engine load becomes lower.

As explained above, in the present embodiment, in the extremely low load region, the swirl control valve 19 and throttle valve 21 are used to control the amount of intake air fed to the combustion chamber 5, but from the viewpoint of control of the amount of intake air, it is also possible not to use the swirl control valve 19 and to use only the throttle valve 21. Therefore, below, referring to FIGS. 12 and 13, the differences between the case of using only the throttle valve 21 to control the amount of intake air and the case of using the swirl control valve 19 and throttle valve 21 to control the amount of intake air in the extremely low load region will be explained.

Figure 12:
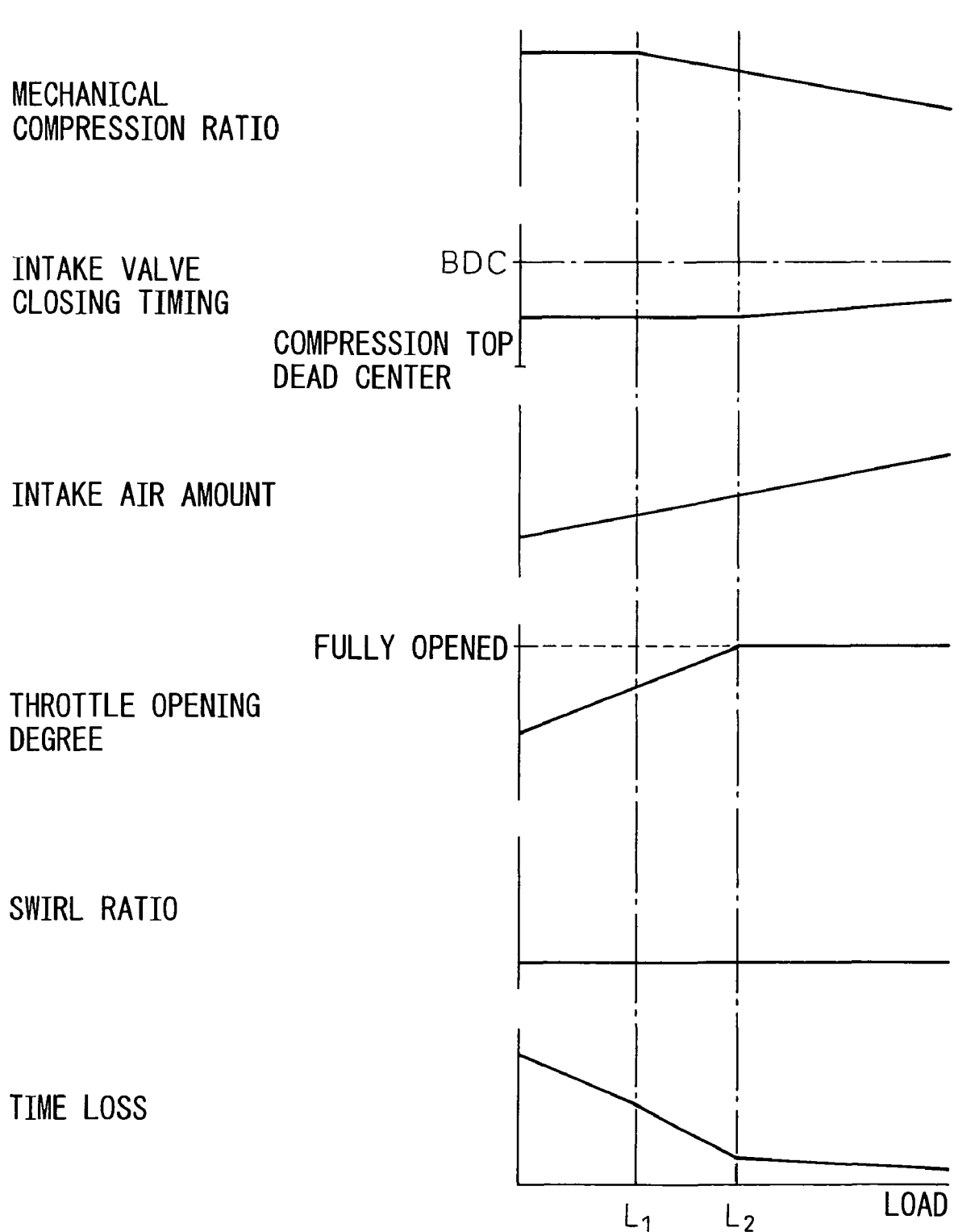
FIG. 12 is a view showing the change in mechanical compression ratio etc. in accordance with the engine load.
Figure 13:
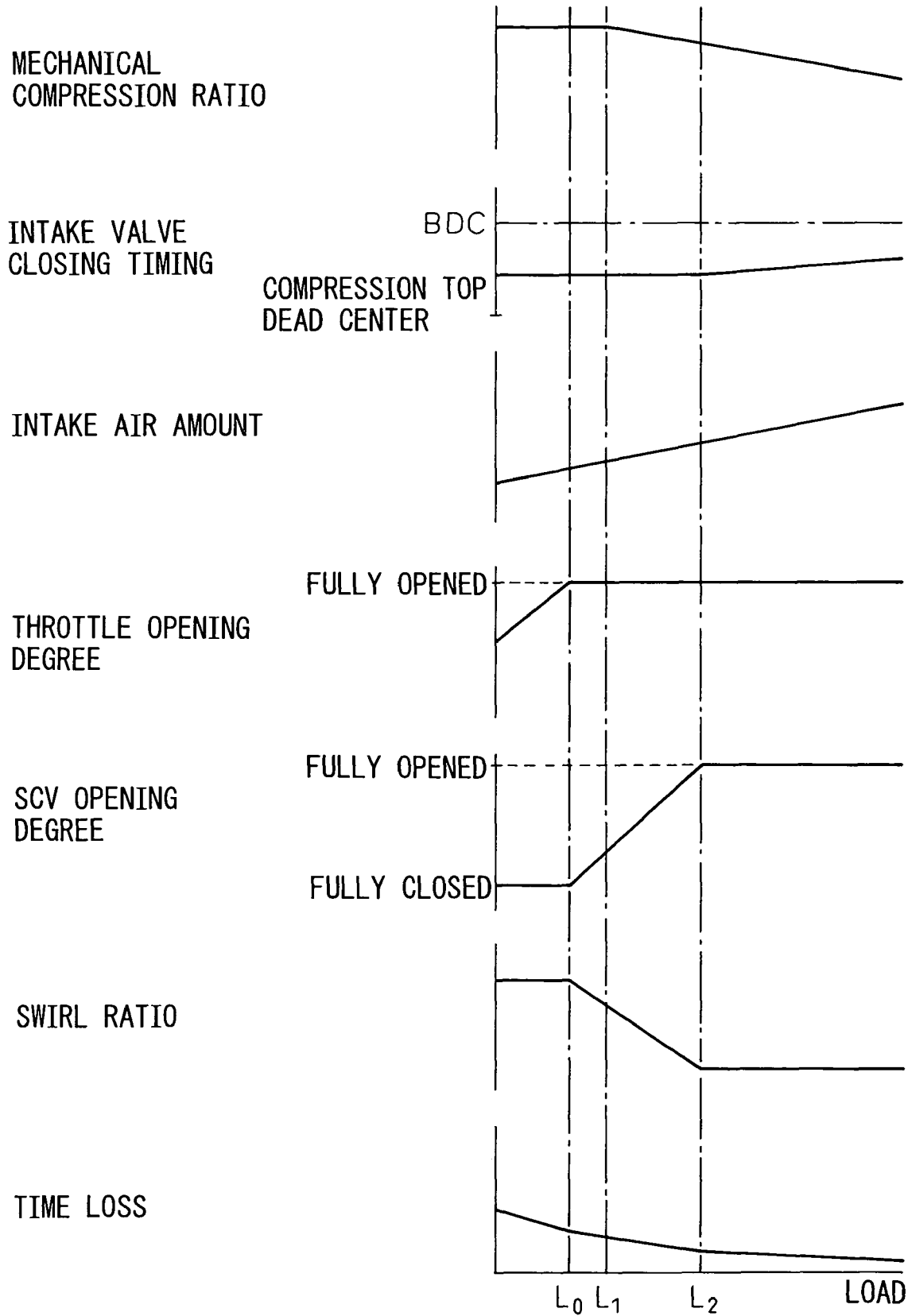
FIG. 13 is a view showing the change in mechanical compression ratio etc. in accordance with the engine load.

FIGS. 12 and 13 show the changes in the mechanical compression ratio, the closing timing of the intake valve 7, the amount of intake air, the opening degree of the throttle valve 21, the opening degree of the swirl control valve (SCV) 19, the swirl ratio, and the time loss, in accordance with the engine load, at the engine low load operating state. FIG. 12 shows the case of using only the throttle valve 21 to control the amount of intake air in the extremely low load region, while FIG. 13 shows the case of using the swirl control valve 19 and throttle valve 21 to control the amount of intake air in the extremely low load region.

When using only the throttle valve 21 to control the amount of intake air in the extremely low load region, as shown in FIG. 12, as the engine load becomes lower from the engine load $L_2$, the amount of intake air fed to the combustion chamber 5 is reduced by making the opening degree of the throttle valve 21 smaller. At this time, the swirl control valve 19 is not used, so the swirl ratio of the air fed into the combustion chamber 5 becomes substantially constant at a low value regardless of the engine load.

When making the opening degree of the throttle valve 21 smaller to control the amount of intake air in this way, the pressure in the combustion chamber 5 at the time of closing of the intake valve 7 is low. Along with this, the pressure (compression end pressure) and temperature (compression end temperature) in the combustion chamber 5 at compression top dead center also become lower. In this way, if the compression end pressure and compression end temperature become low, the air-fuel mixture will become harder to burn in the combustion chamber 5 and as a result the combustion time of the air-fuel mixture will become longer. Therefore, the smaller the opening degree of the throttle valve 21, the longer the combustion time of the air-fuel mixture.

In particular, in the present embodiment, as explained above, at the time of engine low load operation, the expansion ratio, that is, the mechanical compression ratio, is made 20 or more. Therefore, the volume of the combustion chamber 5 when the piston 4 is at compression top dead center is extremely small and therefore the S/V ratio becomes extremely large. For this reason, heat is easily robbed from inside of the combustion chamber 5 through the walls of the combustion chamber. This also causes the combustion time of the air-fuel mixture to become longer. Therefore, the greater the mechanical compression ratio, the longer the combustion time of the air-fuel mixture.

If the combustion time of the air-fuel mixture becomes longer in this way, as explained later, the time loss becomes larger. That is, the smaller the opening degree of the throttle valve and the larger the mechanical compression ratio, the greater the time loss. This increase in time loss invites deterioration of the heat efficiency.

Here, the relationship between the combustion time and time loss of an air-fuel mixture will be briefly explained. Referring to the PV diagram shown in FIG. 14, the changes of the states 1 to 4 in the figure show the changes in a constant-volume cycle. Further, the area enclosed by the lines connecting the states 1 to 4 in the figure show the energy obtained by burning the fuel.

Figure 14:
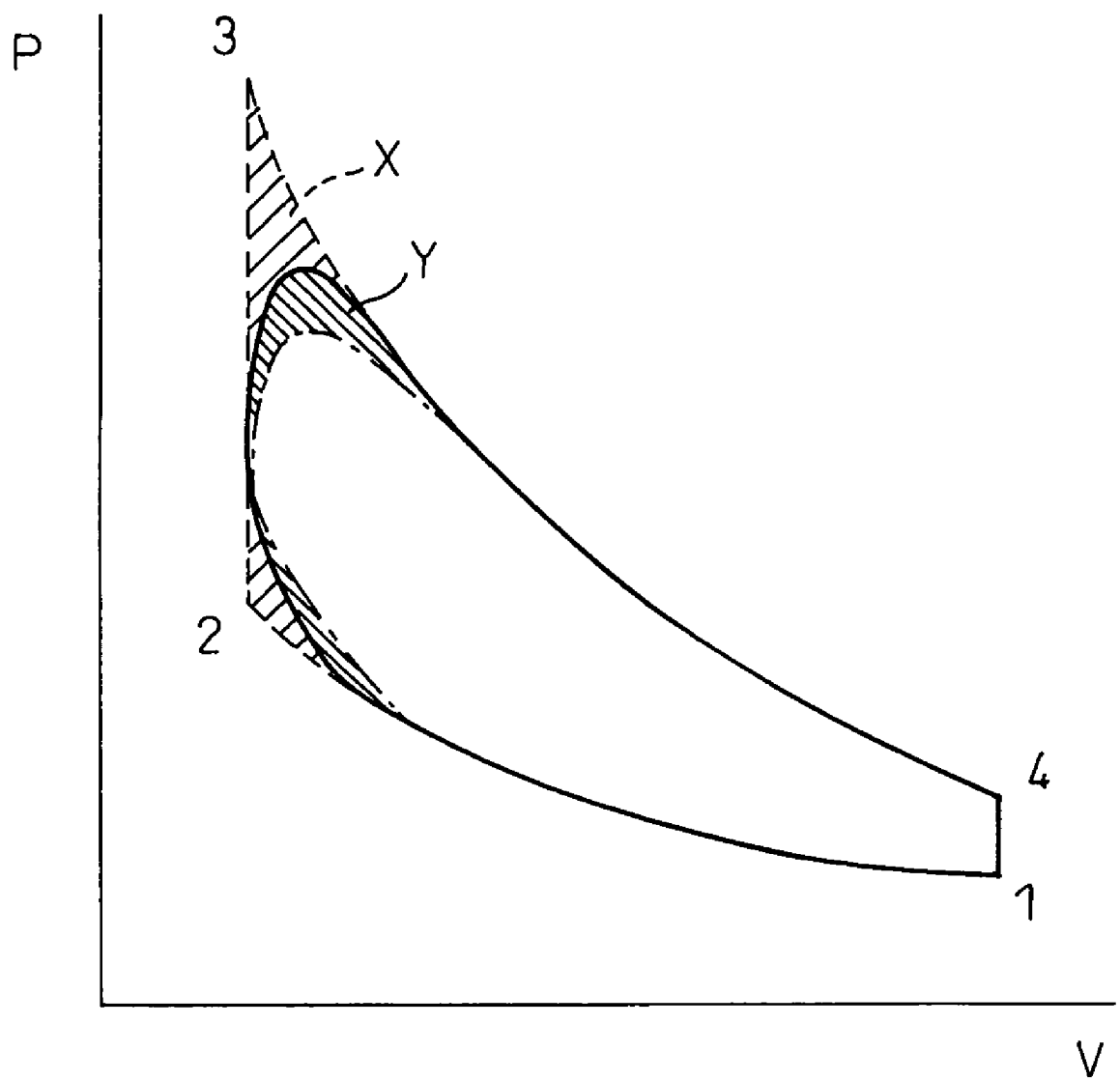
FIG. 14 is a view for explaining time loss.

Here, the change from the state 2 to the state 3 as shown by the broken line in FIG. 14 shows the change in state when heat is supplied in a certain volume, that is, when combustion ends instantaneously at compression top dead center. However, actual combustion does not end instantaneously, since a certain amount of combustion time is required. If the combustion time becomes longer in this way, the states are not changed such as shown by the broken line in FIG. 14 and for example the trend becomes as shown by the solid line in FIG. 14. If the state proceeds in this way, an energy loss corresponding to the area of the hatched part X will occur from the energy obtained by combustion of fuel in a constant-volume cycle (corresponding to area enclosed by lines connecting states 1 to 4 in the figure). This energy loss is called "time loss". As the combustion time increases, this time loss also increased.

For example, if the combustion time becomes longer than the case shown by the solid line in FIG. 14, the state is shifted as shown by the single dot broken line of FIG. 14. If the state is shifted in this way, in addition to the hatched part X, energy loss corresponding to the area of the hatched part Y occurs.

On the other hand, when like-in the present embodiment using the swirl control valve 19 and throttle valve 21 to control the amount of intake air in the extremely low load region, as shown in FIG. 13, first, as the engine load becomes lower from the engine load $L_2$, the amount of intake air fed to the combustion chamber 5 is reduced by making the opening degree of the swirl control valve 19 smaller. At this time, the swirl ratio of the air fed into the combustion chamber 5 is made to increase in accordance with the opening degree of the swirl control valve 19.

After this, in the region of a load lower than the engine load $L_0$ when the opening degree of the swirl control valve 19 reaches zero or substantially zero, as the engine load becomes lower from the engine load $L_0$, the amount of intake air fed to the combustion chamber 5 is reduced to make the opening degree of the throttle valve 21 smaller. At this time, the swirl control valve 19 is made fully closed or substantially fully closed, so the swirl ratio of the air fed into the combustion chamber 5 is held at a high value.

Here, in the same way as when using only the above throttle valve to control the amount of intake air, in the extremely low load region, as the engine load becomes lower, the opening degree of the swirl control valve 19 is made smaller. Along with this, the pressure in the combustion chamber 5 at the time of closing of the intake valve 7 becomes lower and the compression end pressure and compression end temperature become lower. Further, along with the increase of the mechanical compression ratio, heat is easily robbed from inside the combustion chamber 5. For this reason, in the extremely low load region, even if using the swirl control valve 19 to control the amount of intake air, the combustion time of the air-fuel mixture tends to become longer.

However, in the present embodiment, by making the opening degree of the swirl control valve 19 smaller as the engine load becomes lower, the swirl ratio is made larger. If the swirl ratio becomes larger in this way, the air-fuel mixture is stirred in the combustion chamber 5 and the air-fuel mixture becomes easier to burn, so the combustion speed increases. For this reason, it is possible to suppress to a minimum a drop in the compression end pressure and compression end temperature, and an increase in combustion time due to an increase in mechanical compression ratio.

Further, even in the region of a load lower than the engine load $L_0$ when the opening degree of the swirl control valve 19 reaches zero or substantially zero, the swirl ratio is held at a high value, so in this region as well, it is possible to suppress a drop in the compression end pressure and compression end temperature, and an increase in combustion time due to an increase in mechanical compression ratio.

In this way, in the present embodiment, in the region of a load lower than the engine load $L_2$ when the closing timing of the intake valve 7 reaches the limit closing timing, it is possible to suppress an increase in the combustion time, that is, an increase in the time loss, so it is possible to improve the heat efficiency.

Note that in the above embodiment, the region of a load lower than the engine load $L_2$ when the closing timing of the intake valve 7 reaches the limit closing timing is defined as the extremely low load region and only in this extremely low load region, the swirl control valve 19 is used to control the amount of intake air. However, the extremely low load region may also be the region in the engine low load region where the load is slightly higher than the engine load $L_2$ and thereby the swirl control valve 19 may be used to control the amount of intake air starting from a slightly higher load than the engine load $L_2$.

Further, in the above embodiment, in the extremely low load region, as the engine load becomes lower, first the opening degree of the swirl control valve 19 is made smaller, then, after the opening degree of the swirl control valve 19 becomes zero, the opening degree of the throttle valve 21 is reduced. However, it is also possible in the extremely low load region that, as the engine load becomes lower, first the opening degree of the swirl control valve 19 is reduced, then the opening degree of the throttle valve 21 is reduced so as to make the opening degree of the throttle valve 21 smaller before the opening degree of the swirl control valve 19 becomes zero. Further, to suitably control the amount of intake air fed to the combustion chamber 5, as the engine load becomes lower, it is also possible to simultaneously make the opening degree of the swirl control valve 19 and the opening degree of the throttle valve 21 smaller.

Next, the operation control routine will be explained while referring to FIG. 15.

Figure 15:
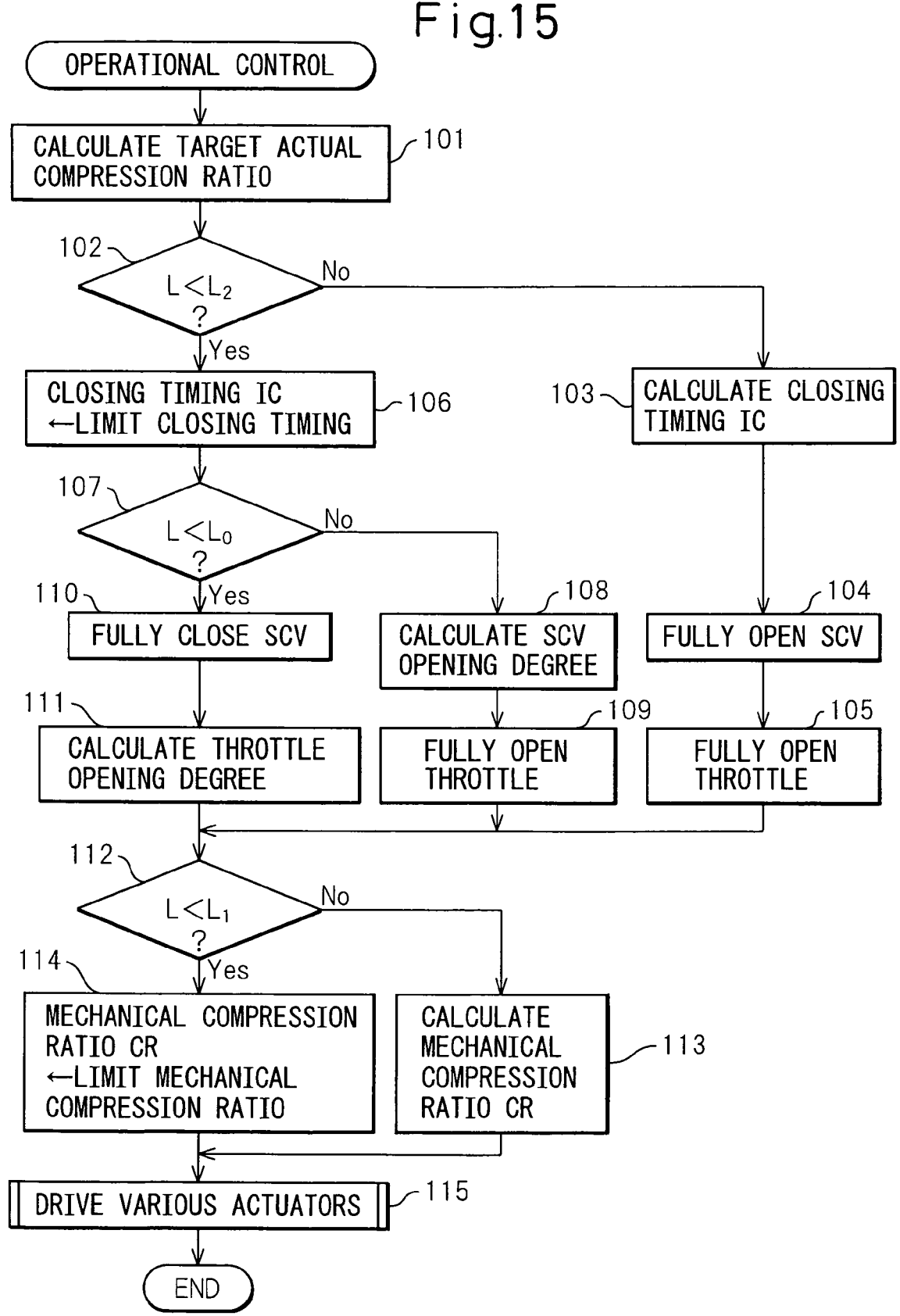
FIG. 15 is a flowchart for operational control.
Figure 16A:
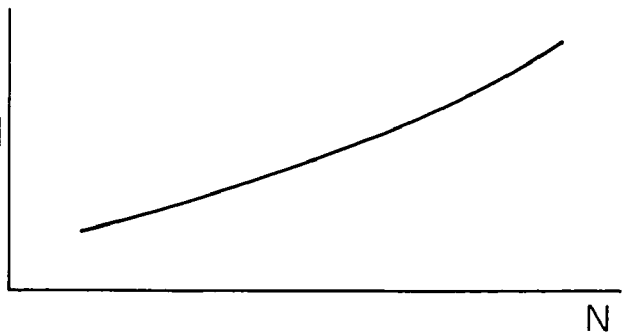
FIGS. 16A to 16E are views showing maps for calculating the target actual compression ratio etc.
Figure 16B:
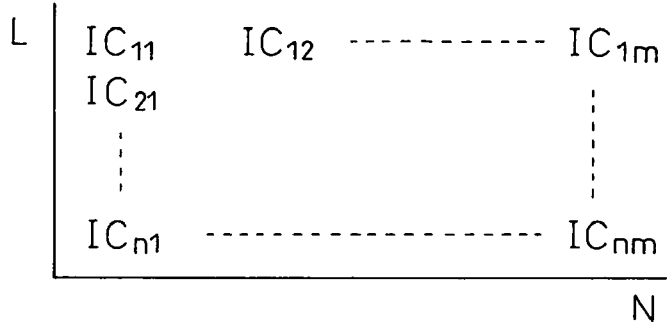

Referring to FIG. 15, first, at step 101, the map shown in FIG. 16A is used to calculate the target actual compression ratio. As shown in FIG. 16A, this target actual compression ratio becomes higher the higher the engine speed N. Next, at step 102, it is judged if the current engine load L is lower than the load $L_2$ shown in FIGS. 10A and 10B etc. When it is judged that $L \geq L_2$, the routine proceeds to step 103 where the map shown in FIG. 16B is used to calculate the closing timing IC of the intake valve 7. That is, the closing timing IC of the intake valve 7 required for feeding the required amount of intake air into the combustion chamber 5 is stored as a function of the engine load L and engine speed N in the form of a map as shown in FIG. 16B in the ROM 32. This map is used to calculate the closing timing IC of the intake valve 7. Next, at steps 104, 105, the opening degrees of the swirl control valve 19 and throttle valve 21 are made fully open and the routine proceeds to step 112.

Figure 16C:
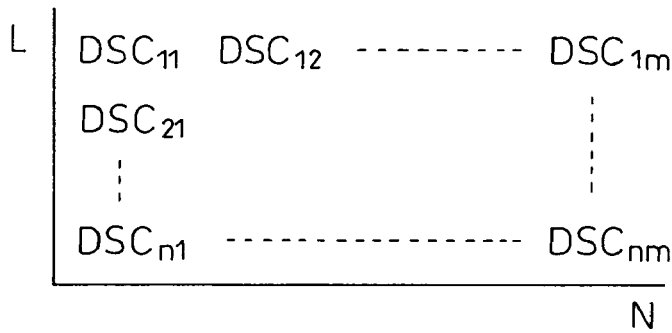

On the other hand, when it is judged at step 102 that $L < L_2$, the routine proceeds to step 106. At step 106, the closing timing IC of the intake valve 7 is made the limit closing timing. Next, at step 107, it is judged if the engine load L is lower than the load $L_0$ shown in FIGS. 10A and 10B etc. When it is judged that $L \geq L_0$, the routine proceeds to step 108 where the opening degree DSC of the swirl control valve 19 is calculated. That is, the opening degree DSC of the swirl control valve 19 required for feeding the required amount of intake air into the combustion chamber 5 is stored as a function of the engine load L and engine speed N in the form of a map shown in FIG. 16C in the ROM 32. This map is used to calculate the opening degree DSC of the swirl control valve 19. Next, at step 109, the opening degree of the throttle valve 21 is made fully open and the routine proceeds to step 112.

Figure 16D:
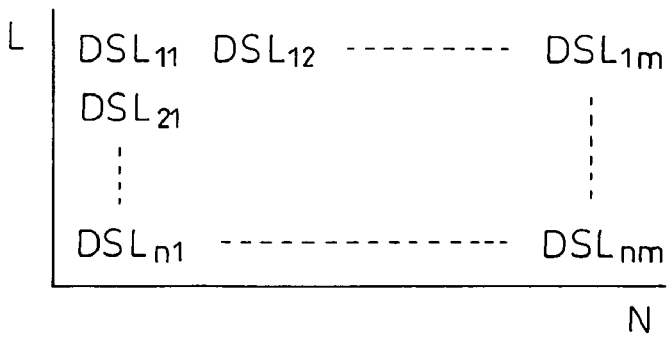

On the other hand, when it is judged at step 107 that $L < L_0$, the routine proceeds to step 110 where the opening degree of the swirl control valve 19 is made fully open. Next, at step 111, the opening degree DSL of the throttle valve 21 is calculated. That is, the opening degree DSL of the throttle valve 21 required for feeding the required amount of intake air into the combustion chamber 5 is stored as a function of the engine load L and engine speed N in the form of a map as shown in FIG. 16D in the ROM 32. This map is used to calculate the opening degree DSL of the throttle valve 21. After this, the routine proceeds to step 112.

Figure 16E:
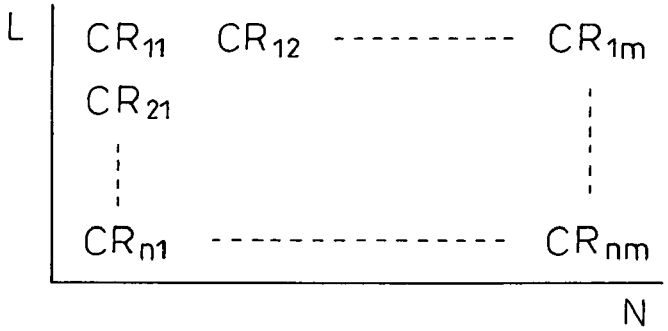

At step 112, it is judged if the engine load L is lower than the load $L_1$, shown in FIGS. 10A and 10B. When it is judged that $L \geq L_1$, the routine proceeds to step 113 where the map shown in FIG. 16E is used to calculate the mechanical compression ratio CR. That is, the mechanical compression ratio CR required for making the actual compression ratio the target actual compression ratio is stored as a function of the engine load L and engine speed N in the form of a map as shown in FIG. 16E in advance in the ROM 32. At step 113, this map is used to calculate the mechanical compression ratio CR. After this, the routine proceeds to step 114.

On the other hand, when it is judged at step 112 that $L < L_1$, the routine proceeds to step 114 where the mechanical compression ratio CR is made the limit mechanical compression ratio. Next, at step 115, the various actuators are driven. Specifically, the mechanical compression ratio is made the mechanical compression ratio CR by controlling the variable compression ratio mechanism A and the closing timing of the intake valve 7 is made the closing timing IC by controlling the variable valve timing mechanism B. Further, the opening degree of the swirl control valve 19 is made the opening degree DSC, and the opening degree of the throttle valve 21 is made the opening degree DSL. After this, the control routine is ended.

While the invention has been described by reference to specific embodiments chosen for purposes of illustration, it should be apparent that numerous modifications could be made thereto by those skilled in the art without departing from the basic concept and scope of the invention.

LIST OF REFERENCE NOTATIONS 1 crank case
2 cylinder block
3 cylinder head
4 piston
5 combustion chamber
7 intake valve
19 swirl control valve
21 throttle valve
A variable compression ratio mechanism
B variable valve timing mechanism

The invention claimed is:

1. A spark ignition type internal combustion engine comprising a variable compression ratio mechanism able to change a mechanical compression ratio, a variable valve timing mechanism able to control a closing timing of an intake valve, and an air flow control valve controlling an air flow in a cylinder, wherein the mechanical compression ratio is made maximum so as to obtain the maximum expansion ratio at the time of engine low load operation and the actual compression ratio at the time of engine low load operation is made an actual compression ratio substantially the same as that at the time of engine medium and high load operation, and wherein said air flow control valve is used to control an air flow in a cylinder and an amount of intake air fed into the combustion chamber when the engine load is in an extremely low load region.

2. A spark ignition type internal combustion engine as set forth in claim 1, wherein said closing timing of the intake valve is shifted as the engine load becomes lower in a direction away from intake bottom dead center until a limit closing timing enabling control of the amount of intake air fed into the combustion chamber.

3. A spark ignition type internal combustion engine as set forth in claim 2, wherein said extremely low load region is a region of a load lower than the engine load when said closing timing of the intake valve reaches said limit closing timing.

4. A spark ignition type internal combustion engine as set forth in claim 3, wherein at said extremely low load region, the closing timing of the intake valve is held at said limit closing timing.

5. A spark ignition type internal combustion engine as set forth in claim 2, wherein in a region of a load higher than the engine load when the closing timing of the intake valve reaches said limit closing timing, the amount of intake air fed into the combustion chamber is controlled by changing the closing timing of the intake valve without depending on said air flow control valve and a throttle valve arranged in an engine intake passage.

6. A spark ignition type internal combustion engine as set forth in claim 5, wherein in a region of a load higher than the engine load when the closing timing of the intake valve reaches said limit closing timing, the throttle valve is held in the fully opened state.

7. A spark ignition type internal combustion engine as set forth in claim 5, wherein in a region of a load higher than the engine load when the closing timing of the intake valve reaches said limit closing timing, the air flow control valve is held in the fully opened state.

8. A spark ignition type internal combustion engine as set forth in claim 1, wherein in said extremely low load region, a throttle valve arranged in an engine intake passage is substantially fully opened.

9. A spark ignition type internal combustion engine as set forth in claim 1, wherein in said extremely low load region, said air flow control valve and a throttle valve arranged in an engine intake passage are used to control the amount of intake air.

10. A spark ignition type internal combustion engine as set forth in claim 9, wherein at said extremely low load region, said air flow control valve is made smaller in opening degree as the engine load becomes lower, in the region of a load lower than the engine load when said air flow control valve becomes fully closed, a throttle valve arranged in an engine intake passage is used to control the amount of intake air fed into the combustion chamber.

11. A spark ignition type internal combustion engine as set forth in claim 1, wherein said maximum expansion ratio is 20 or more.

12. A spark ignition type internal combustion engine as set forth in claim 1, wherein at the time of engine low speed, regardless of the engine load, said actual compression ratio is made substantially 9 to 11.

13. A spark ignition type internal combustion engine as set forth in claim 12, wherein the higher the engine speed, the higher the actual compression ratio.

14. A spark ignition type internal combustion engine as set forth in claim 1, wherein said mechanical compression ratio is increased as the engine load becomes lower until a limit mechanical compression ratio.

15. A spark ignition type internal combustion engine as set forth in claim 14, wherein in a region of a load lower than the engine load when said mechanical compression ratio reaches said limit mechanical compression ratio, the mechanical compression ratio is held at said limit mechanical compression ratio.

\* \* \* \* \*